March 7, 1939.   S HILLER ET AL   2,149,736
APPARATUS AND METHOD FOR EXPRESSING FLUID
Filed Oct. 21, 1933   13 Sheets-Sheet 4

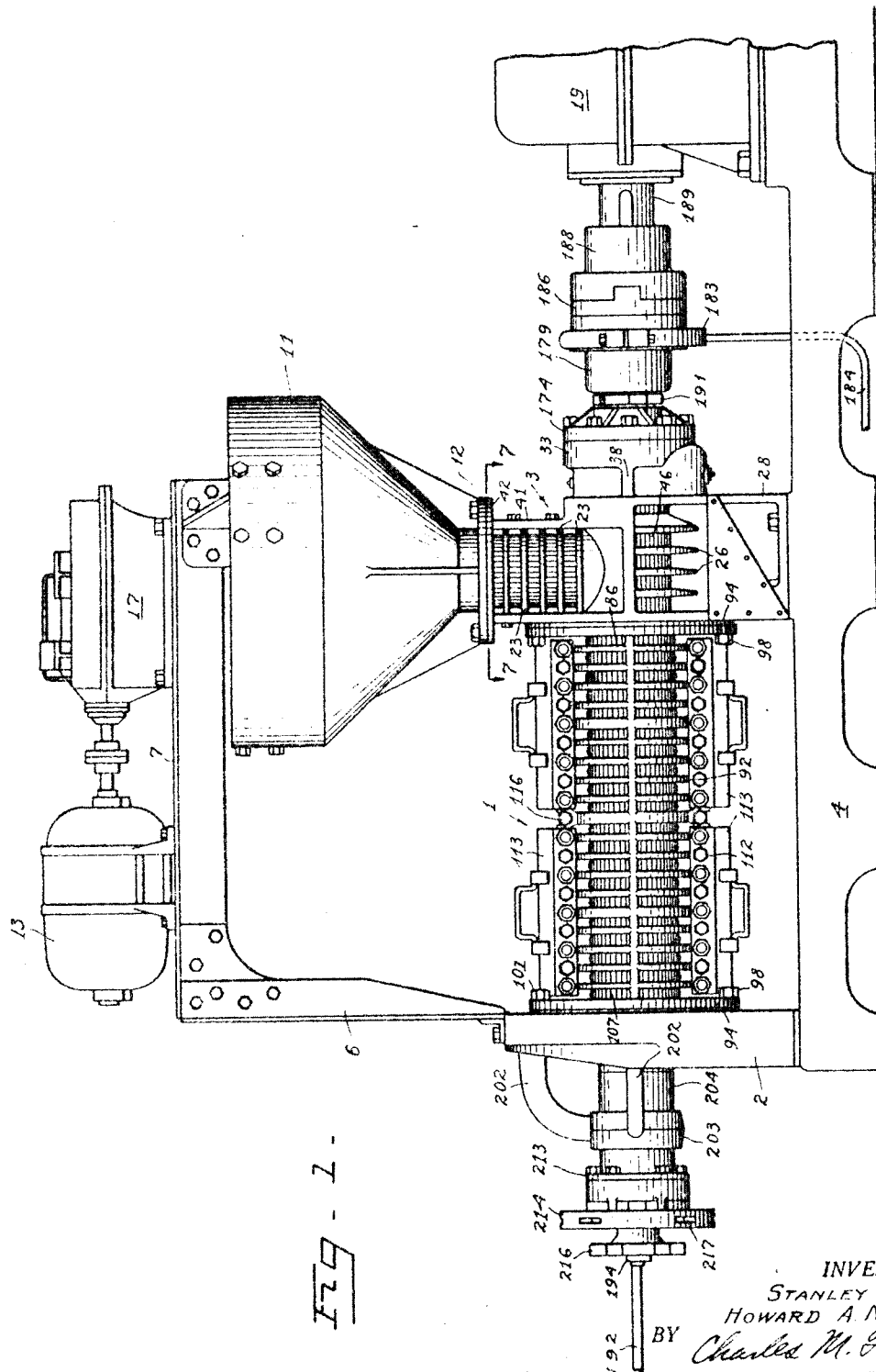

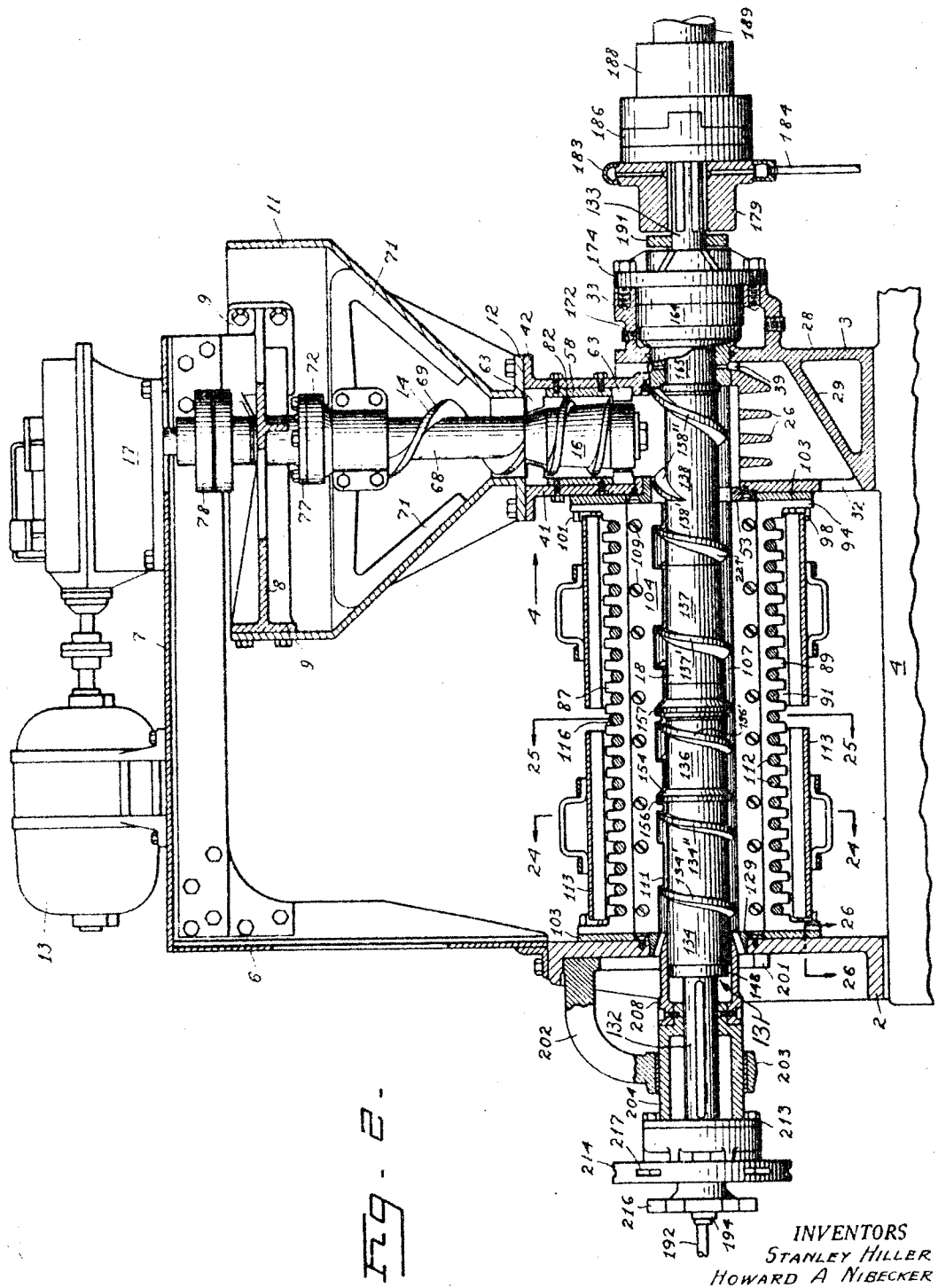

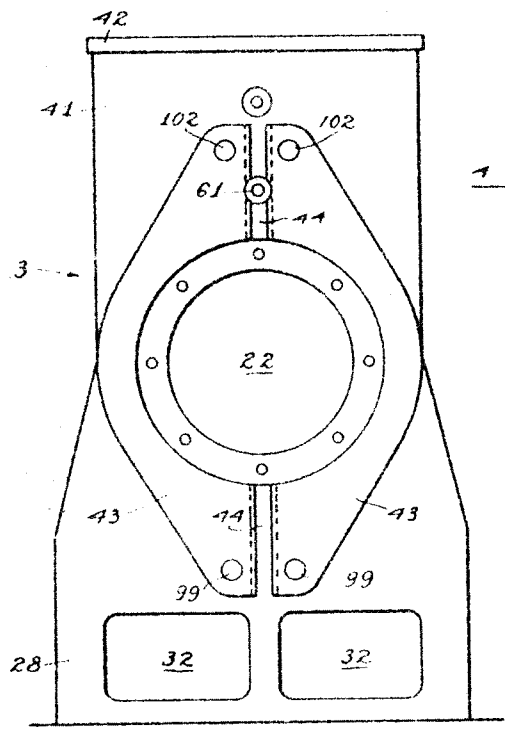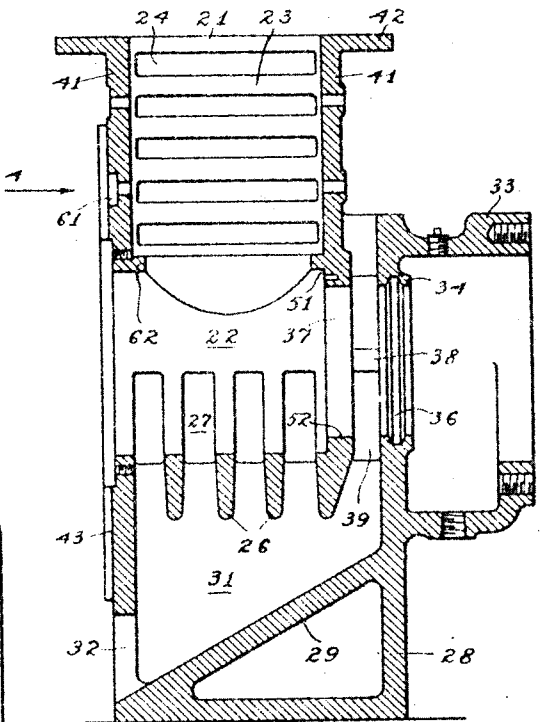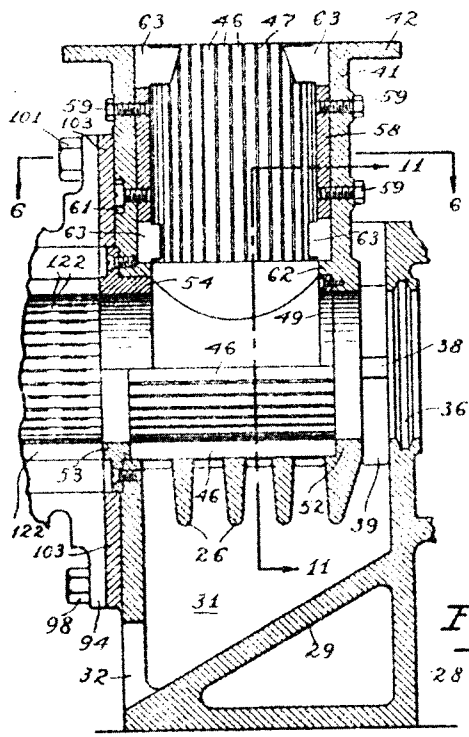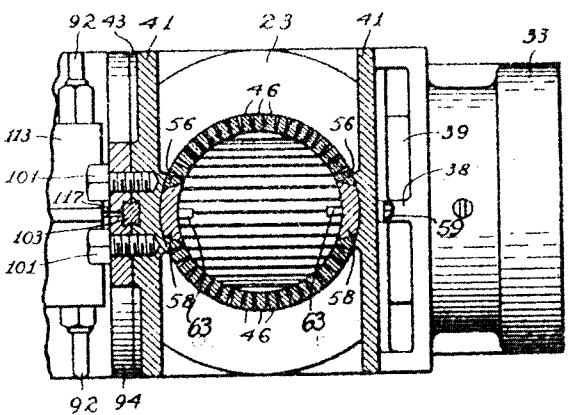

INVENTORS
STANLEY HILLER
HOWARD A NIBECKER
BY Charles M. Firger
ATTORNEY

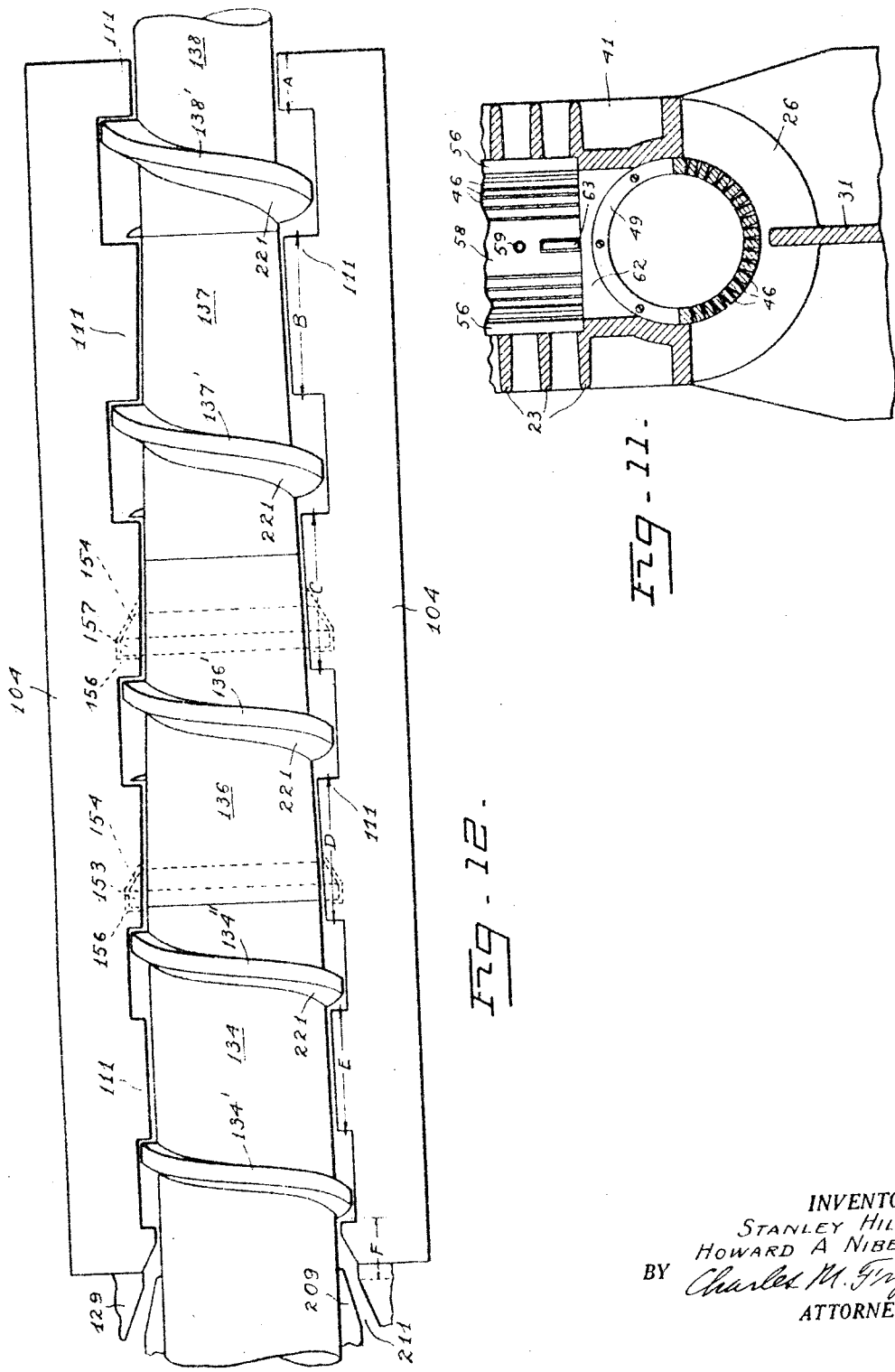

March 7, 1939.   S HILLER ET AL   2,149,736
APPARATUS AND METHOD FOR EXPRESSING FLUID
Filed Oct. 21, 1933   13 Sheets-Sheet 6
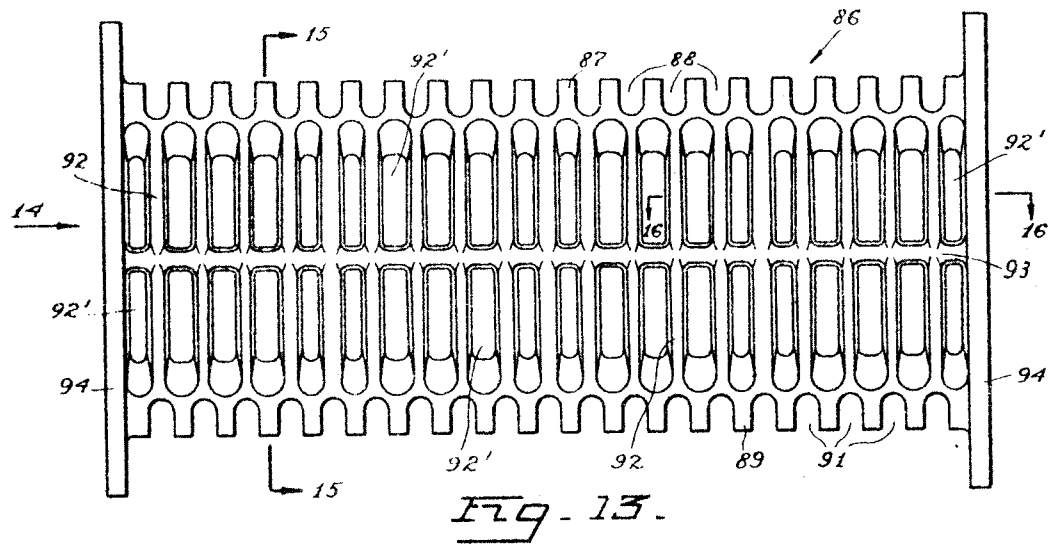
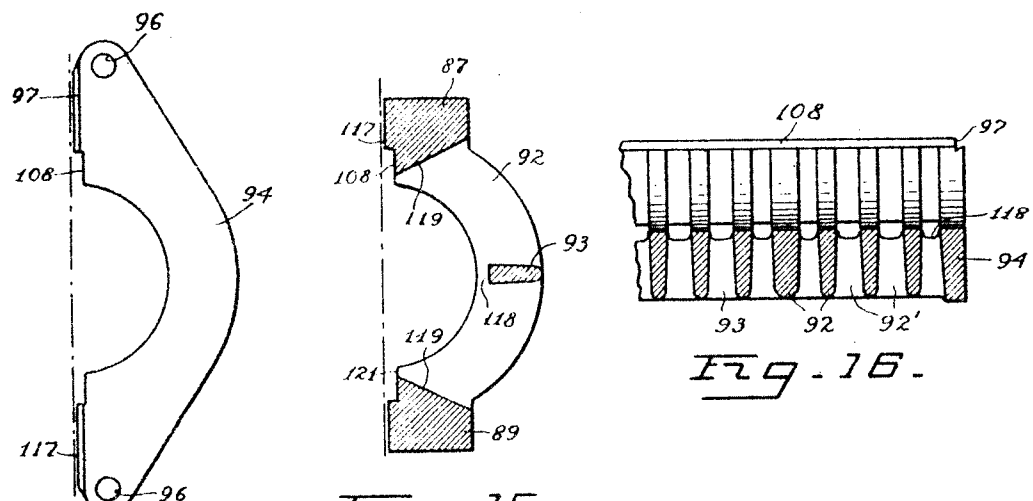
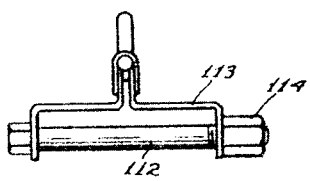
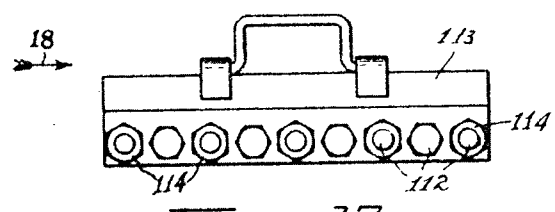
INVENTORS
STANLEY HILLER
HOWARD A NIBECKER
BY Charles M. Fryer
ATTORNEY.

March 7, 1939. S. HILLER ET AL 2,149,736
APPARATUS AND METHOD FOR EXPRESSING FLUID
Filed Oct. 21, 1933 13 Sheets-Sheet 8

INVENTORS
STANLEY HILLER
HOWARD A. NIBECKER
BY Charles M. Fryer
ATTORNEY

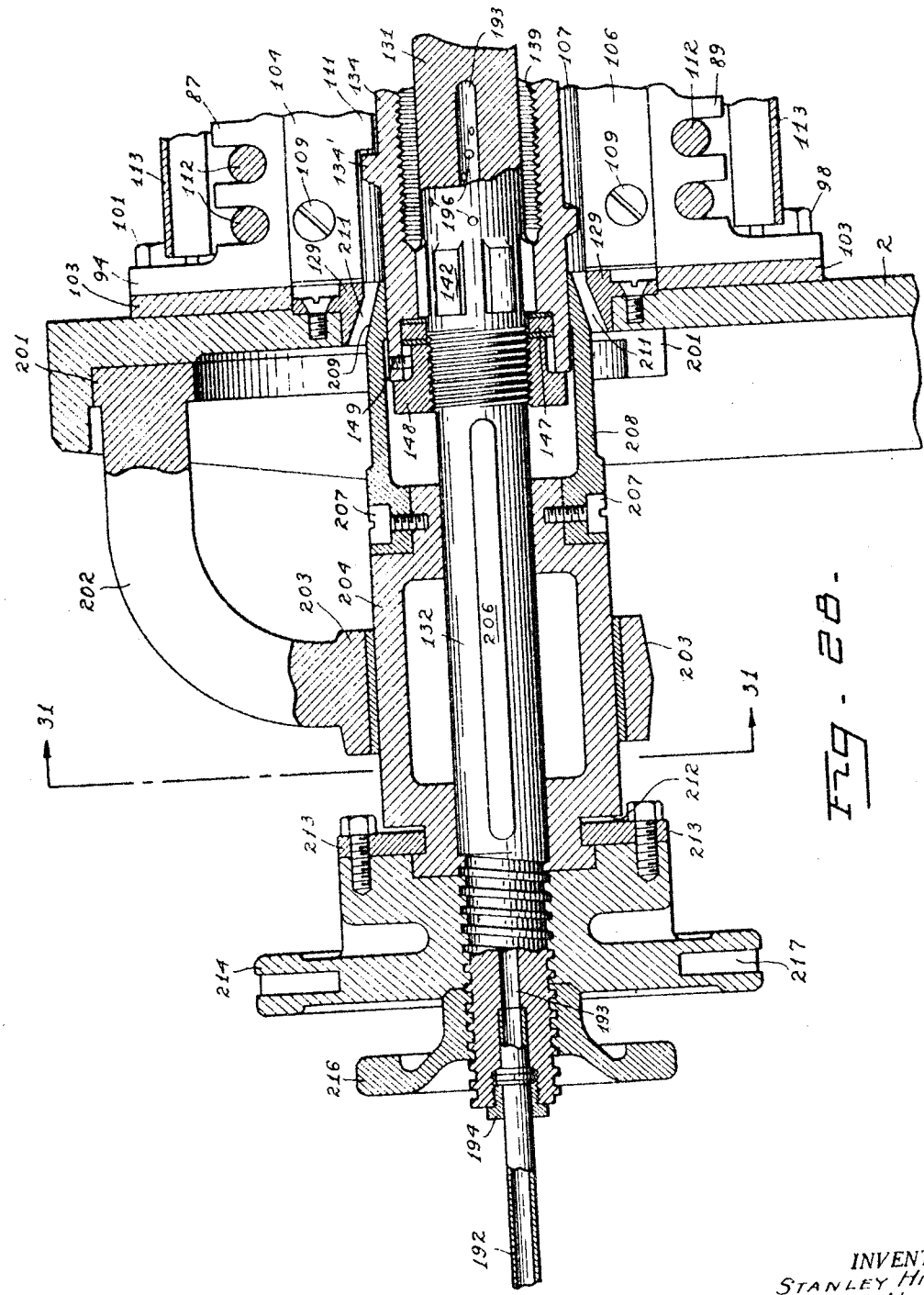

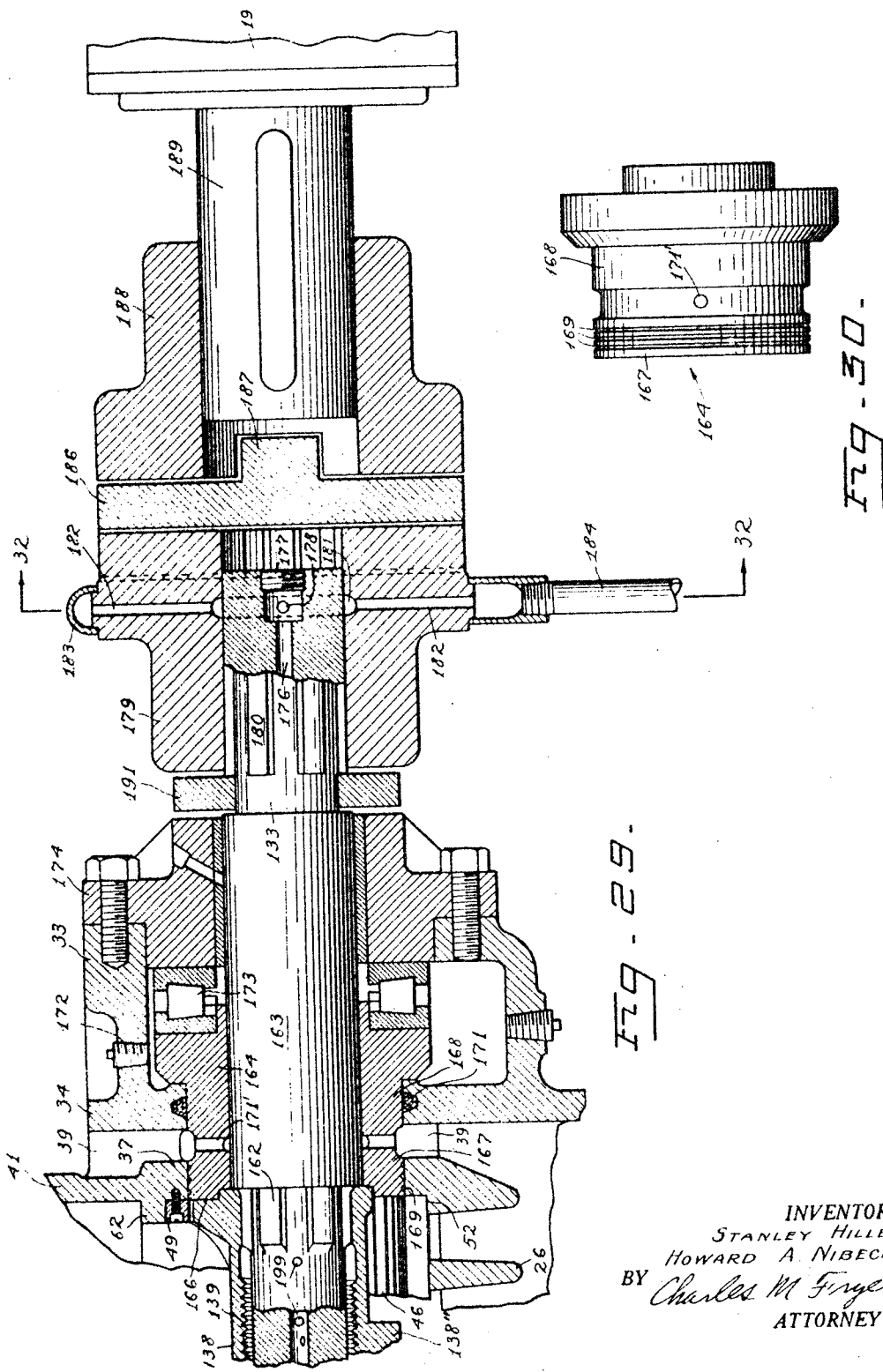

March 7, 1939. S HILLER ET AL 2,149,736
APPARATUS AND METHOD FOR EXPRESSING FLUID
Filed Oct. 21, 1933 13 Sheets-Sheet 11
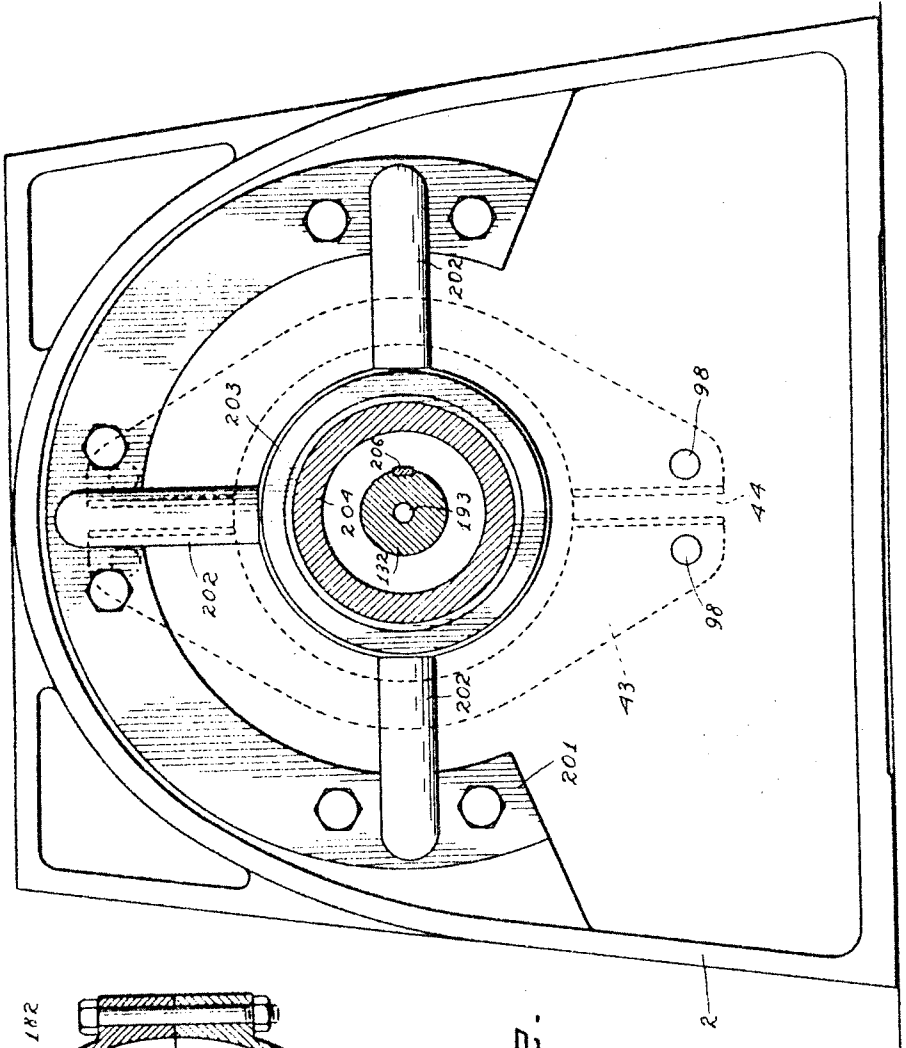
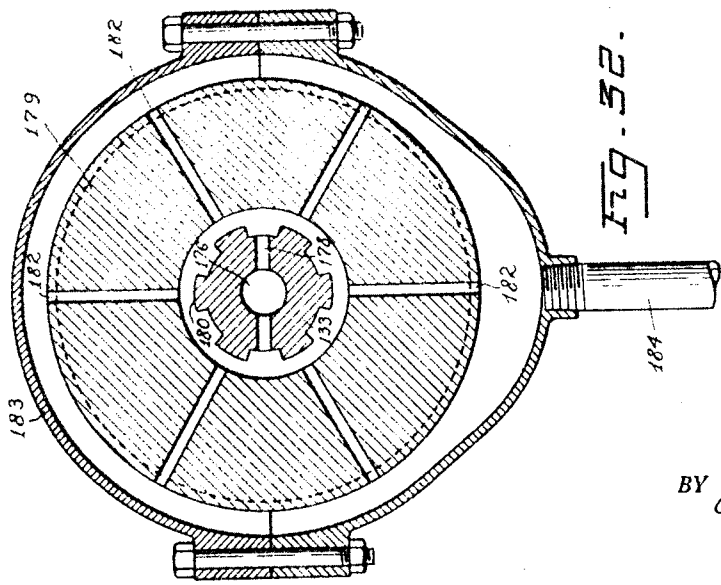
INVENTORS
STANLEY HILLER
HOWARD A. NIBECKER
BY Charles M. Fryer
ATTORNEY

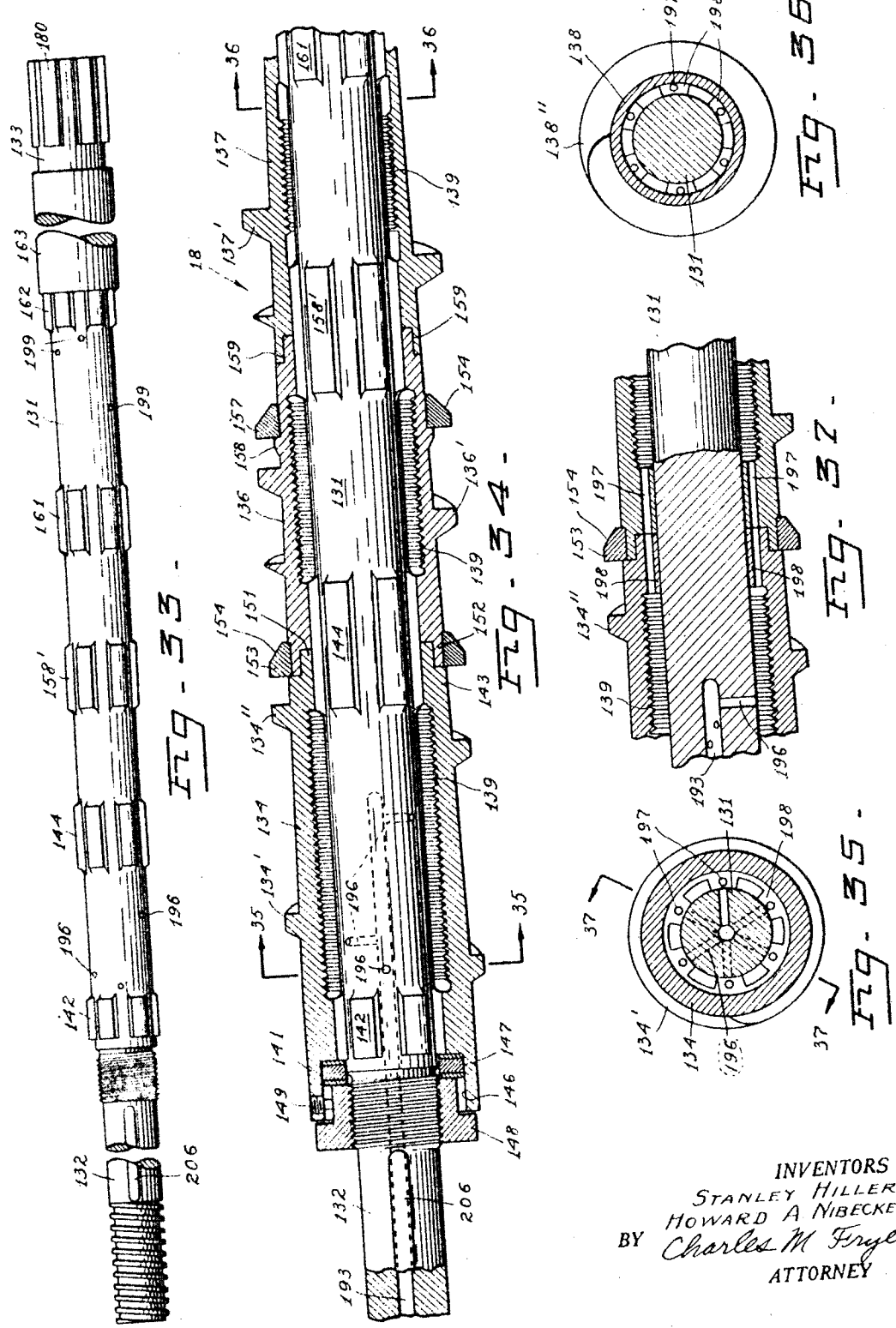

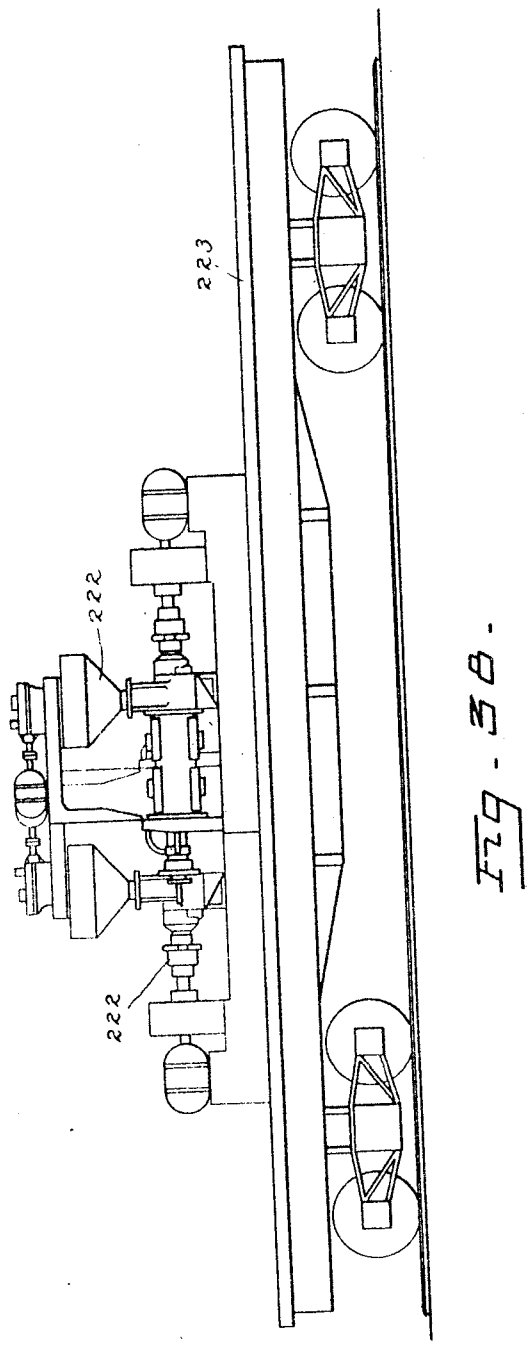

Patented Mar. 7, 1939

2,149,736

UNITED STATES PATENT OFFICE 2,149,736

APPARATUS AND METHOD FOR EXPRESSING FLUID

Stanley Hiller, Berkeley, and Howard A. Nibecker, San Mateo, Calif., assignors to Stanley Hiller, Ltd., San Francisco, Calif., a corporation of California Application October 21, 1933, Serial No. 694,568

45 Claims. (Cl. 100—48)

Our invention relates to an apparatus and method for expressing fluid from material containing such fluid. More particularly, the invention relates to the type of continuous rotary screw press for pressing out fats and/or oils from fatty materials, such as cotton seed, copra, fish meal, offal and nuts.

An important object of our invention is the provision of a press and method for expressing fluid which will, in comparison with previously employed presses and methods, effect a higher yield of oil or fat from the material, leaving only a comparatively small percent of oil or fat in the resulting cake or meal.

Another object of our invention is the provision of a press and method for expressing fluid, which will enable accomplishment of the foregoing described object and will enable handling of the material rapidly, to provide for increase in capacity of the press per unit of time in comparison with presses heretofore employed.

Another object of our invention is the provision of a press and method which will form a comparatively thick discharge cake.

Another object of our invention is the provision of a press and method which will effect expressing of fluid from most materials without requiring a tempering apparatus for first processing the material, to thus enable unheated or cold raw material in its natural state of viscosity to be handled directly by the press.

Another object of our invention is the provision of a press and method which, with respect to certain classes of materials such as cotton seed meats and soya bean, requiring some sort of processing before final expulsion of the fluid in the main pressing operation, will enable such processing to be materially simplified so as to necessitate only slight cooking of the material in the processing.

Another object of our invention is the provision of a press apparatus which is of comparatively simple construction and, consequently, is economical to build.

Another object of our invention is the provision of a press construction which is of such character as to enable facile assembly of the parts, and facile disassembly thereof for replacement, cleaning or repair when so desired. The press embodies numerous structural features for accomplishing this described object. Such features will be referred to more particularly in the description of the invention.

Another object of our invention is the provision of a high pressure press in which pressure acts upon the material substantially throughout the entire length of the press cage assembly.

Another object of our invention is the provision of a press which creates such high pressure as to cause a deleterious change in the material, such as scorching or burning, if the material is not cooled, together with means for circulating a cooling fluid entirely through the press to prevent such deleterious change and to maintain a relatively high viscosity of the material.

Another object of our invention is the provision of structural features, hereinafter referred to more particularly in the specification, to enable the press to withstand such high pressure.

Another object of our invention is the provision of a press having means for providing maximum transference of heat from the material being pressed to the cooling fluid.

Another object of our invention is the provision of a press cage construction which will offer substantially no obstruction to the flow of expressed fluid therefrom.

Another object of our invention is the provision of a press having knife bars to prevent turning of the material by the screw pressure applying means, together with improved means for rigidly clamping the knife bars.

Another object of our invention is the provision of a press having a discharge cone arrangement of such character, as to enable any oil or fat expressed at the cone to discharge from the press proper.

Another object of our invention is the provision of an improved type of screen bar assembly in the press.

Another object of our invention is the provision of a press having comparatively widely spaced screw flights providing friction areas therebetween, to enhance building up of pressure.

Another object of our invention is the provision of a press employing screw flights having a special pitch and root diameter relationship, to effect building up of pressure.

Another object of our invention is the provision of means, preferably in the form of internal cones or dam rings, in one or more of such friction areas to provide for restriction of flow or damming of the material, to thereby enhance further the maintenance of pressure throughout the entire length of the press.

Another object of our invention is the provision of feed means for the press proper or main press, which will effect a preliminary expressing of fluid to provide for increased main press capacity.

Another object of our invention is the provision of feed means or a feed press, of the character described, which can be operated at various speeds relative to the main press, to control pressure conditions in the main press.

A further object of our invention is the provision of a comparatively simple and easy to assemble screen bar assembly in the feed press.

An additional object of our invention is the provision of a press apparatus of such simple construction as to enable transportation thereof on a vehicle, so that the apparatus can be operated at different localities.

The invention possesses numerous other objects, which will become apparent from a perusal of the following description of the invention.

General description of invention

In general terms, the method of our invention is one which comprises applying such great pressure on the material as to cause fluid in the form of oil or fat to be substantially completely expressed therefrom with little or no previous processing of the material by heat. The pressure is so great as to cause normally a deleterious effect on the material such as scorching or burning or even a chemical change derogatory to fluid expulsion. To prevent the scorching, burning and/or chemical change, and at the same time to maintain a relatively high viscosity of the material, so as to enhance maintenance of pressure, the material is simultaneously cooled by a cooling fluid as pressure is applied thereto.

For carrying out the method of our invention, we preferably employ a main rotary screw press of the continuous type, in which pressure is maintained substantially throughout the entire length of the press. This is accomplished primarily by virtually providing a plurality of independent main press sections forming a unitary press structure; each of the press sections comprising a screw flight followed by a relatively long blank space or friction area. Thus, the main press comprises a plurality of separated screw flights having relatively long blank spaces between the screw flights. Knife bars project into the blank spaces to prevent turning of the material by the screw means. To enhance further the building up of pressure, the screw flights are constructed to decrease in pitch and increase in root diameter from the feed end of the press to the discharge end; and damming means or internal cones are provided in some of the blank spaces to restrict partially the flow of material.

Because of the fact that the volume of material becomes smaller as it travels from the feed end of the press to the discharge end, as a result of loss of fluid, the blank spaces, from the feed end of the press to the discharge end, are of progressively smaller volume to compensate for reduction in volume of the material. Hence, the material is always compacted in the blank spaces to provide for sufficient development of pressure to cause expressing of fluid along the entire length of the press. The method of our invention, therefore, also involves compensating for decrease in volume of the material caused by expressing of fluid therefrom.

Cooling of the material is effected in the main press by passage of cooling fluid, such as water, throughout the entire length of the main press shaft assembly which includes sleeves upon which the screw flights are integrally formed. The sleeves have internal portions, spaced from the main shaft and formed with cooling fins which are contacted by the cooling fluid, to provide for rapid transference of heat from the material to the cooling fluid.

As the main press develops a terrifically high pressure, the screw flight sleeves are preferably secured to the main shaft by splines, so as to carry some of the forces imposed on the main shaft, thus allowing a comparatively small diameter shaft without sacrifice of strength. Furthermore, adjacent sleeves are telescopically connected by a male and female joint connection, to provide a tight, serviceable and leak-proof joint; and a special discharge cone structure is utilized to place the point of expulsion of fluid at the discharge cone well within the press to avoid loss of fluid.

A feed press is employed for the main press which, in addition to supplying material to the main press, effects a partial expressing of fluid to increase the capacity of the main press and partially to compress the material for the main press. Preferably, the feed press is operated by a variable speed driving mechanism, the speed of which can be controlled to suit operating conditions which might obtain in the main press.

Numerous particular features of construction are employed in the press apparatus for the twofold purpose of providing a strong structure capable of withstanding terrifically high pressure, and of providing for quick assembly and disassembly of the parts. Also, we provide novel screen and knife bar arrangements. It is thought unnecessary to describe such features in greater detail at this time, as they will be thoroughly described as the specification proceeds.

Description of drawings

Reference will now be made to the drawings for a more detailed description of the invention.

Fig. 1 is a side elevational view of the press apparatus of our invention.

Fig. 2 is a longitudinal vertical sectional view of the press apparatus, parts of the structure being shown in elevation.

Fig. 3 is a longitudinal vertical sectional view of the feed press housing or casting, which casting also provides a support for one end of the main press.

Fig. 4 is an end elevation of the feed press casting, looking in the direction of arrow 4 in Figs. 2 and 3.

Fig. 5 is a view similar to that of Fig. 3, illustrating in addition the mounting of screen bars in the feed press and the attachment of the feed end of the main press.

Fig. 6 is a horizontal section taken in a plane indicated by line 6—6 of Fig. 5.

Fig. 11 is a fragmentary sectional view taken in a plane indicated by line 11—11 of Fig. 5.

Fig. 12 is a schematic view, illustrating the screw flight arrangement of the main press screw and the friction areas between the screw flights, together with the dam rings, for building up extremely high pressure.

Fig. 13 is a side elevational view of one of the arcuate main press cage sections.

Fig. 14 is an end elevation looking in the direction of arrow 14 in Fig. 13.

Fig. 15 is a vertical transverse section taken in a plane indicated by line 15—15 of Fig. 13.

Fig. 16 is a fragmentary horizontal section taken in a plane indicated by line 16—16 of Fig. 13.

Fig. 17 is a side elevation of the bolt carrier, by which the main press cage sections can be quickly secured together.

Fig. 18 is an end elevation of the carrier of Fig. 17, looking in the direction of arrow 18 in Fig. 17.

Fig. 28 is a fragmentary longitudinal vertical section of the discharge end of the main press, illustrating the manner of mounting thereof and the discharge cone.

Fig. 29 is a fragmentary longitudinal vertical section of the feed end of the main press, illustrating the main press shaft mounting, the water collecting system and the drive mechanism for the main press shaft.

Fig. 30 is an elevational view of the main press shaft bearing employed at the feed end of the press.

Fig. 31 is a transverse section taken in a plane indicated by line 31—31 of Fig. 28.

Fig. 32 is a transverse section taken in a plane indicated by line 32—32 of Fig. 29.

Fig. 33 is an elevational view, illustrating the construction of the main press screw shaft.

Fig. 34 is a longitudinal vertical section, illustrating the screw flight sleeves on the shaft of Fig. 33; the shaft being shown in elevation.

Fig. 35 is a transverse vertical section taken in a plane indicated by line 35—35 of Fig. 34.

Fig. 36 is a transverse vertical section taken in a plane indicated by line 36—36 of Fig. 34.

Fig. 37 is a longitudinal vertical section through a portion of the main press shaft and adjacent screw sleeves on the shaft, illustrating the manner of conveying the cooling fluid. The section is taken in a plane indicated by line 37—37 of Fig. 35.

Fig. 38 is an elevational view illustrating the mounting of the press apparatus of our invention on a vehicle, such as a flat car.

DETAILED DESCRIPTION OF INVENTION

*General assembly (Figs. 1 and 2)*

Figure 7:
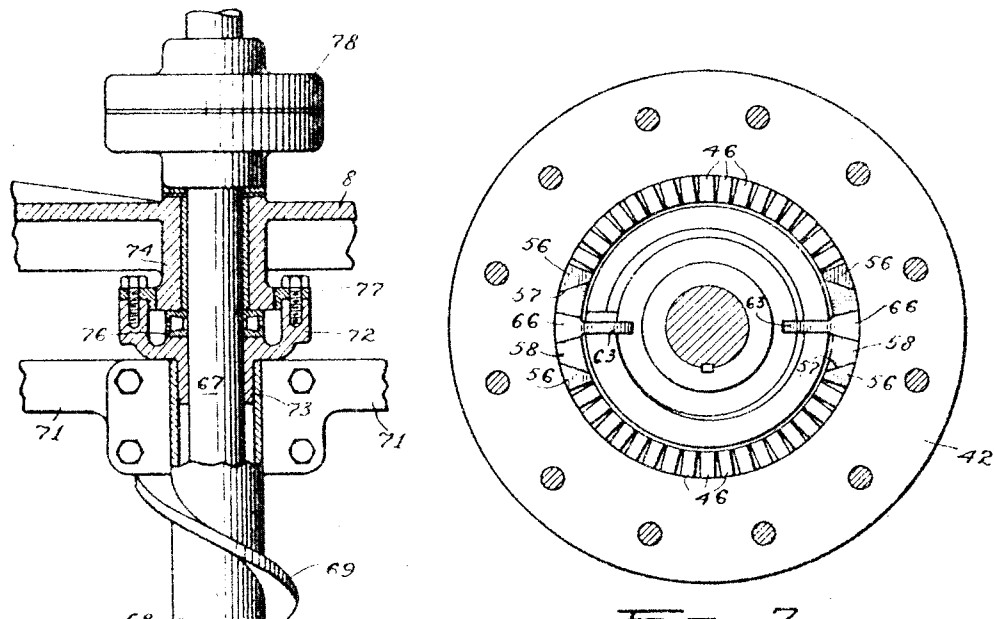
Fig. 7 is a horizontal section taken in a plane indicated by line 7—7 of Fig. 1.
Figure 10:
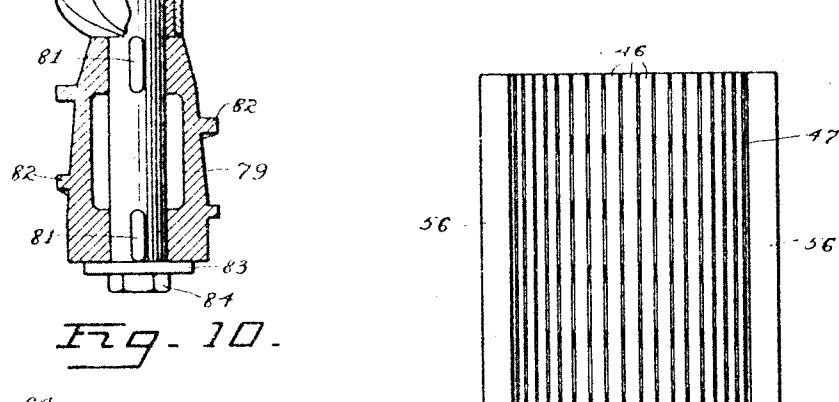
Fig. 10 is a vertical sectional view, partly in elevation, of the feed screw and the hopper screw assembly for the feed press.

The press apparatus of our invention includes a main press 1, mounted at one end on discharge end casting or support 2 and at the opposite end on the feed press casting or housing 3; the castings 2 and 3 being in turn secured to the main supporting frame 4 adapted to hold a suitable container (not shown) for fluid expressed by the press. An upright frame 6 is secured to the top of discharge end casting 2, and supports one end of the motor support 7; the opposite end of the motor support 7 being secured to horizontal bracket plate 8 in turn secured at 9 to the inner side of feed hopper 11. Hopper 11 is provided with annular flange 12 at the bottom, which is bolted to the flanged top of the feed casting 3.

An adjustable speed motor 13 of any suitable type, on support 7, drives the feed screw conveyor 14 and the feed press screw 16, through gear box 17 also mounted on support 7. The main press screw 18 is rotated by any suitable prime mover 19. (Fig. 1.)

Material, such as copra or other fat or oil containing material, to be pressed is placed in hopper 11, from which it is fed into the feed press. An initial expulsion of fluid occurs in the feed press; while the remainder of the material is caught by the main press screw which effects substantially complete expulsion of fluid, leaving a substantially dry residue which is discharged from the main press. The press apparatus of my invention is capable of creating such high pressure as to make it unnecessary to apply a preliminary treatment to most materials to be pressed, such as a steam or a heat treatment heretofore employed for the purpose of enhancing expulsion of fluid. The particular features of construction will now be described:

*Feed press and hopper (Figs. 2 to 11)*

With particular reference to Fig. 3, the feed press housing is an integral casting having the vertical passage 21 leading into the horizontal passage 22; the vertical passage being formed by spaced arcuate ribs 23 providing open spaces 24 therebetween, and the bottom of the horizontal passage 22 being formed by spaced ribs 26 forming open spaces 27 therebetween. Base 28 of the feed press housing is hollow and has a downwardly slanting upper wall 29 integral with vertical partition reenforcing wall 31, which in turn is integral with ribs 26 to provide a rigid structure. Openings 32 are provided at the lower end of wall 29, one on each side of partition wall 31, for egress of fluid expelled from the feed press.

An annular bearing housing 33 is formed at the end of passage 22 remote from the main press end of said passage. Inner vertical wall 34 of the housing 33 provides one of two spaced journals for the main press shaft bearing to be subsequently described, and is provided with annular recess 36 for the reception of suitable packing material. Wall 34 is spaced from a second wall 37 providing a second journal for the bearing, and is joined integrally with wall 37 by ribs 38. End walls 41 of the casting 3 are substantially planar and terminate in upper annular flange 42, to which (Fig. 2) flange 12 of hopper 11 is secured.

As was previously explained, feed housing 3 provides a support for one end of the main press cage;

and the cage supporting end of the feed housing is of a construction particularly designed to facilitate assembly of and disassembly from the main press. The feed press inner end wall 41 is provided (Fig. 4) with two arcuate planar bosses 43 about passage 22, against which end flanges (to be subsequently described) of the main press cage sections are adapted to be secured. The bosses 43 are separated at both the top and bottom by vertical mortise slots 44 having slanting sides diverging inwardly to allow the slots to receive a locking bar only by endwise insertion.

Figure 8:
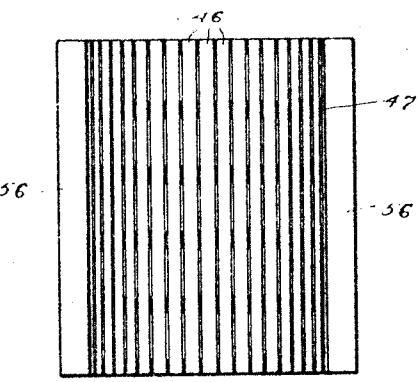
Fig. 8 is an elevational view, illustrating one of the semi-circular screen bar assemblies for the feed press.
Figure 9:
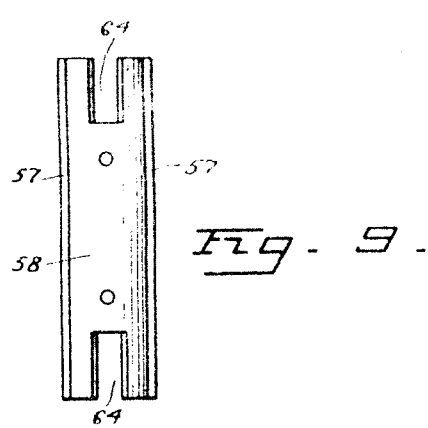
Fig. 9 is a front elevation of one of the vertical screen positioning and knife holding bars employed in the feed press.

Arcuate screen bar assemblies are mounted in the feed press housing, two of the assemblies being mounted in vertical passage 21, and the third assembly in horizontal passage 22 over ribs 26. The screen bars are, preferably, of the same construction as those employed in the main press and will, therefore, not be specifically described at this time. As shown in Fig. 8, each of the arcuate feed press screen bar assemblies comprises a plurality of screen bars 46 welded together along spaced points as indicated at 47. The bottom screen bar assembly over ribs 26 is held in position at one end by arcuate retaining member 49 (Figs. 5 and 11), the lower ends of which abut the top bars of the screen bar assembly. Retainer 49 is secured in a suitable arcuate recess 51 (Fig. 3). One end (Fig. 5) of the bottom screen bar assembly abuts arcuate flange 52 on the feed housing; while the opposite end of such assembly abuts the removably secured arcuate clamping member 53, the top ends of which are coterminous with the top surfaces of the bottom screen bar assembly. A third arcuate retainer 54 opposite to the retainer 49 is removably secured to the feed housing, and has its lower ends abutting both the top bars of the bottom screen bar assembly and the upper ends of clamp 53. It is thus seen that the bottom screen bar assembly is rigidly held in position, and can be rapidly inserted or removed merely by manipulation of the removably secured arcuate retainers 49 and 54, and arcuate clamping ring 53.

Each of the screen bar assemblies in vertical passage 21 has its outermost bars 56 (Figs. 6 and 7) formed with sharp slanting sides adapted to abut complementary slanting sides 57 (Fig. 9) of positioning bars 58. Two positioning bars are employed; each being arcuate in cross section and being removably secured to an end wall 41 of the feed housing. As can be seen most clearly in Figs. 3 and 5, end walls 41 are apertured to receive screws 59 for securing the positioning bars; a portion of the end wall 41 adjacent the main press being countersunk at 61 to receive the head of a screw, so as not to interfere with the mounting of the main press. An integral annular flange 62 is formed at the lower end of the passage 21 to provide an abutment for supporting the positioning bars 58.

From the preceding description, it is apparent that after the positioning bars 58 are mounted, each of the upper screen bar assemblies can be readily slipped into position by endwise insertion between the slanting sides 57 of the positioning bars. Because of such sharp slanting sides, locking means is provided to preclude lateral shifting of the upper screen bar assemblies; and a rigid mounting obtains, inasmuch as flange 12 (Fig. 2) of the hopper serves to hold the upper screen bar assemblies rigidly against endwise displacement.

Knife bars 63 are mounted on positioning bars 58 to cooperate with a screw flight in passage 21, so as to prevent turning of material by the screw flight. A wedge shaped slot 64 (Fig. 9) is formed in both the upper and the lower end portion of each positioning bar 58; and each knife bar 63 is formed with a complementary wedge shaped base portion 66 (Fig. 7) adapted to fit in a slot 64 by endwise insertion. In assembling the knife bars 63, the lower ones are first placed in the lower slots 64 of positioning bars 58, and bars 58 are then mounted on flange 62. After the positioning bars 58 are secured to the feed housing, the upper knife bars 63 can then be inserted in the upper slots 64.

Means (Figs. 2 and 10) are provided for effecting feeding of material into the feed press and for effecting expulsion of some fluid in the vertical feed press passage 21. Shaft 67 has welded thereto a sleeve 68 having screw conveyor 69 welded thereon, which screw conveyor is adapted to feed material from hopper 11 into the feed press. Distributor arms 71 are also secured to sleeve 68 at the top of screw 69; and a thrust bearing cage 72 has a lower sleeve portion 73 welded in between sleeve 68 and shaft 67. The upper end portion of shaft 67 is journaled in bearing 74 formed integral with bracket plate 8; the lower end of bearing 74 providing an abutment for vertical thrust bearing 76 seated in bearing cage 72. An annular packing member 77 is secured for rotation with bearing cage 72; and abuts the outer surface of bearing 74 to provide a seal. Shaft 67 is connected for rotation from motor 13 by coupling 78. Since the sleeve 68, distributor arms 71, screw conveyor 69 and the bearing cage 72 are all secured to shaft 67, it is apparent that the entire assembly can be positioned as a unit, merely by endwise insertion of the upper end of shaft 67 through bearing 74 and by connection of shaft 67 with coupling 78.

Feed press screw body 79 (Fig. 10), which is rotatable in passage 21 of the feed press, is secured for rotation with shaft 67, by means of keys 81 on the shaft engaging in suitable keyways in the body 79; body 79 being a single casting having the screw flight 82 integral therewith. As can be seen from Fig. 10, screw body 79 is clamped in position between the lower end of sleeve 68 and a plate 83 which is held by nut 84 screwed onto shaft 67.

The upper knife bars 63 (Fig. 2) are adjacent the upper end of screw flight 82 and the lower knife bars 63 are adjacent the lower end of screw flight 82. Such knife bars effectively preclude turning of material in the feed press, to allow for positive pressure action for expulsion of fluid. Not only does the feed press provide for initial pressing out of fluid, but it insures material being fed to the main press under a comparatively high pressure, to enhance maximum expulsion of fluid by the main press.

*Main press cage assembly (Figs. 2, 5, 6 and 13 to 26)*

From the feed press, material is fed through the main press cage by means of screw means to be subsequently described. The main press cage is composed of a pair of similar cage sections, each of which (Figs. 13 through 16) comprises an arcuate casting 86. The casting terminates in an upper longitudinal flange 87, provided with slots 88 for receiving clamping bolts to hold abutting cage sections together. A similar longitudinal flange 89, having slots 91, is formed at the lower part of each section. Flanges 87 and 89 are joined by arcuate ribs 92 spaced apart to provide openings 92' therebetween, through which openings fluid can escape.

The ribs 92 are reenforced intermediate their ends, by cross ribs which all lie in the same plane and actually provide a reenforcing flange 93 extending the length of the section. As can be seen more clearly in Figs. 13, 14 and 26, each cage section has both ends terminating in an enlarged abutment flange 94, each end of which is provided with a fastening bolt receiving aperture 96, and is formed with a vertical slot 97 having an inwardly slanting side.

Figure 27:
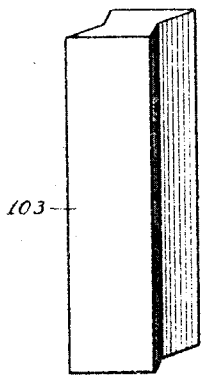
Fig. 27 is a perspective view of the locking bar employed for securing the ends of the main press cage sections.
Figure 26:
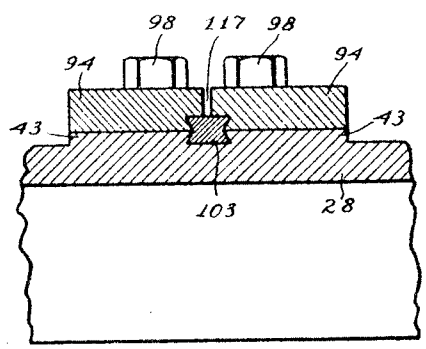
Fig. 26 is a fragmentary horizontal section, taken in a plane indicated by line 26—26 of Fig. 2, illustrating the manner of securing the ends of the main press cage sections.

In securing the cage sections on the feed housing, each section is positioned with a flange 94 thereof abutting a boss 43 on the feed housing; and a fastening screw 98 (Figs. 2, 4 and 5) is passed through lower aperture 96 in flange 94 and into threaded aperture 99 in the feed housing. The cage section can, thus, swing about screw 98 as a pivot. When the two cage sections are properly positioned, screws 101 are passed through upper apertures 96 of the cage section flanges 94, and are screwed into upper threaded apertures 102 in the feed housing. An endwise positionable locking bar 103 (Fig. 27) is placed in the passage, formed by feed housing slot 44 and by adjacent cage section slots 97, to thus hold the cage sections in position; the cross section of the locking bar being the same as that of the passage. Screws 98 and 101 are usually cinched up tightly, to provide a rigid mounting, although the upper screws 101 are not absolutely necessary, as the locking bars 103 will hold the assembly.

The manner of mounting the cage sections 86 on discharge end casting 2 (Fig. 2) is exactly the same as that described for the feed housing casting; consequently, it need not be described in detail. The same reference characters are applied to parts of the discharge end casting cage mounting, as are applied to the feed housing cage mounting.

Each cage section (Figs. 19 and 22) supports a knife bar 104, a retainer bar 106, and a semi-cylindrical screen bar assembly 107 held between a knife bar and a retainer bar. With particular reference to Figs. 14, 15, 24 and 25, it will be noted that a longitudinally extending slot or notch 108 open sidewardly and inwardly, is formed in flanges 87 and 89 of each cage section; each notch being adapted to receive snugly a bar 104 or 106. When the screen bars of an assembly 107 are laid in a cage section, they are rigidly clamped between knife bar 104 and retainer bar 106, both of which bars are rigidly secured to flanges 87 and 89, respectively, by fastening screws 109. Special types of screen bars are, preferably, employed and they will subsequently be described. Unlike the retainer bars 106, which have both their upper and lower edges straight, knife bars 104 have a plurality of spaced projections 111 which cooperate with screw flights on the main press screw, in a manner which will be later described.

Figure 24:
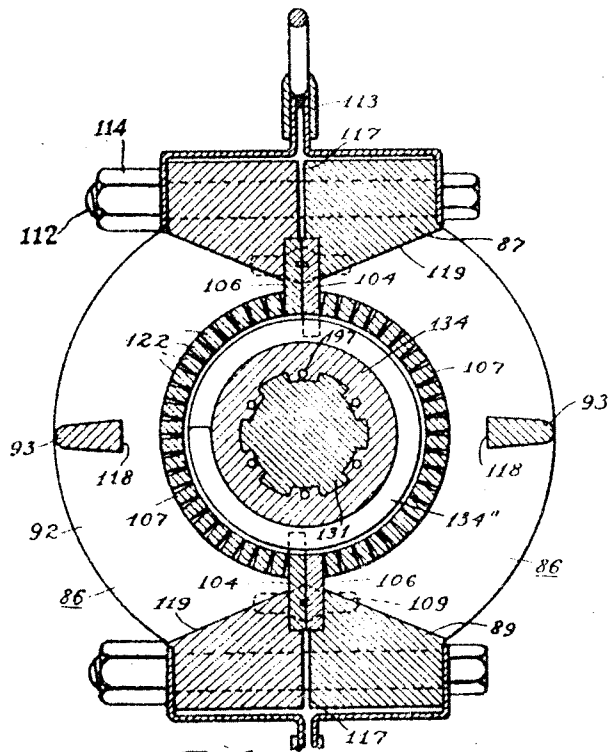
Fig. 24 is a transverse section of the main press taken in a plane indicated by line 24—24 of Fig. 2.
Figure 25:
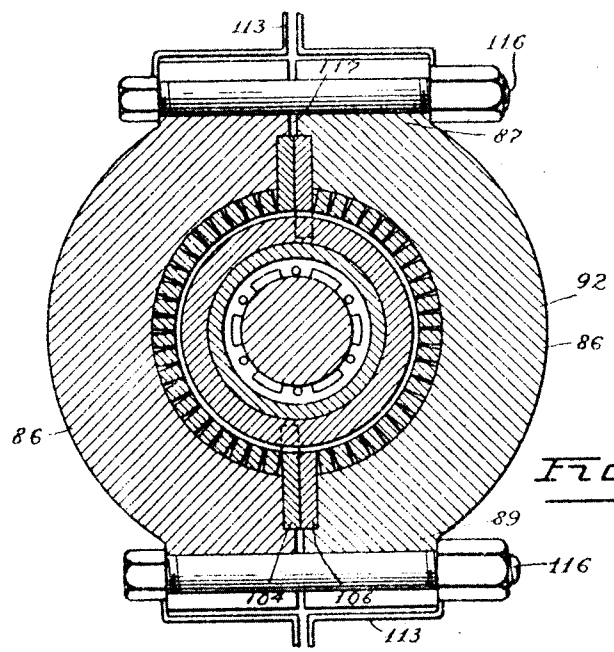
Fig. 25 is a transverse section of the main press taken in a plane indicated by line 25—25 of Fig. 2.
Figure 23:
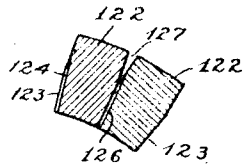
Fig. 23 is a fragmentary transverse section taken in a plane indicated by line 23—23 of Fig. 22.

As can be observed more clearly from Figs. 24 and 25, a knife bar 104 is mounted at each junction of the cage sections to provide a pair of oppositely disposed knife bars.

When the cage sections 86 have the desired bars mounted rigidly therein, they are supported in the manner previously described, with the addition of clamping bolts 112 and 116 which fit in the open ended slots 88 and 91 of each cage section. To facilitate positioning of the clamping bolts 112, a carrier 113 (Figs. 17 and 18) for a plurality of bolts is provided. The bolts are loosely mounted in the carrier, which supports the bolts in the same spaced relationship as exists between slots 88 and 91; so that the bolts can be readily placed in position and cinched up by nuts 114. All the bolts, except one bolt 116 intermediate the ends of the cage sections and at both the top and bottom of the cage, are thus mounted on carriers. The intermediate bolts 116 provide means for holding the cage sections 86 together when they are first assembled prior to positioning of bolts 112, and tightening of screws 98 and 101. With reference to Fig. 1, it will be noted that every other bolt is reversely positioned, so that nuts and heads will be on both sides of the press, which arrangement expedites tightening or loosening of the nuts because two workmen may be employed for these operations at the same time without interfering with each other, one workman at each side of the press. To conserve space without sacrifice of strength, the heads of the bolts may be made smaller than the nuts.

The described mounting of the cage sections permits rapid disconnection thereof when it is desired to remove screen bar assemblies 107 for cleaning or repair. In this event, bolts 112 are loosened and removed by the carriers 113, the two bolts 116 are removed, upper screws 101 are removed and lower screws 98 are slightly loosened. Thus, the cage sections can be swung apart on lower screws 98 as pivots; and as can be observed from Fig. 26, the locking bars 103 will allow such pivotal swinging inasmuch as they merely lock the cage sections against endwise displacement.

In connection with the cinching up of bolts 112 and 116 and with particular reference to Figs. 14, 15, 24 and 25, it will be observed that each of bars 104 and 106, is slightly thicker than the depth of notch 108 in which the bar seats. Consequently, when the cage sections are clamped together, a space 117 obtains between flanges 87 and also between flanges 89. Such space is indicated diagrammatically by the vertical broken lines in Figs. 14 and 15, each of which broken lines designates the vertical center plane of the cage assembly. Because of the provision of the spaces 117, pressure can be concentrated on bars 104 and 106 to provide an extremely rigid mounting therefor, which is desirable because of the tremendous stresses imposed upon the knife bars 104, caused by impact of material which the main press screw tends to rotate.

Fluid which the screw means in the main press causes to be pressed out of the material, flows through the screen bar assemblies 107; and in order to have unimpeded flow of the fluid, the cage sections 86 are of such construction as to provide for unobstruction of the screen bar assemblies at all locations, except where the assemblies contact the arcuate ribs 92. This is accomplished (Figs. 15, 16 and 24) by having the inner sides 118 of the longitudinally extending reenforcing flanges 93 spaced from the inner sides of ribs 92, in the spaces or openings 92' between ribs 92. Consequently, flanges 93 cannot block the flow of fluid. Also, it will be noted that flanges 87 and 89 of each cage section have their inner sides 119 slanting toward the outside of the cage from a position spaced (indicated at 121, Fig. 15) from the inner sides of ribs 92. As a result, there exists an unobstructed space closely adjacent each half of the cage assembly, from a knife bar 104 to a retainer bar 106.

*Screen bar construction*

Each screen bar 122 (Figs. 20, 22 and 23), in each semi-cylindrical screen bar assembly 107, has both sides thereof tapered inwardly at its lower end, as indicated at 123; the taper being the same for each side. However, at regularly spaced intervals slits 124 are formed in only one side of each screen bar, with the exception of one, to allow for egress of fluid. The sides 126 of such slits and the tapered parts 123 of each screen bar are at such angles that, when the screen bars are assembled in abutting relationship with the tapered parts 123 in contact, the slit sides 126 are radially disposed with respect to the axis of the entire cylindrical screen bar assembly. As a result, as the inner ends of the screen bars wear away, slits 124 will always be of the same size throughout, so as not to destroy the filtering characteristics of the screen bar assembly. When the screen bars are assembled, it will be noted that spaces 127 obtain between the outer ends of the screen bars, and that the solid portions 128 of the screen bars are over ribs 92 of the cage sections.

Figure 21:
Fig. 21 is a bottom elevational view of an end screen bar, only one of which is employed in each semicylindrical screen bar assembly for the main press.
Figure 22:
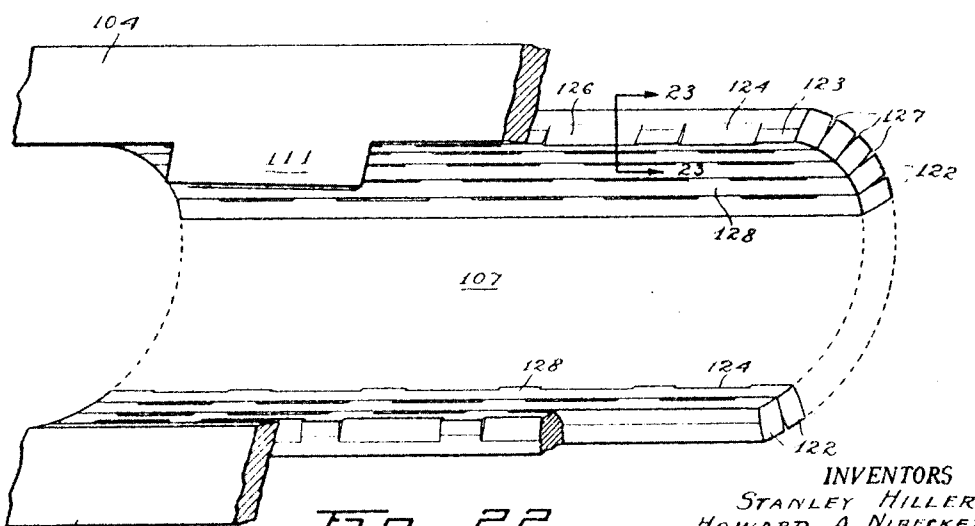
Fig. 22 is a more or less schematic perspective view, illustrating a semi-cylindrical main press screen bar assembly.

In assembling the screen bars and with particular reference to Fig. 22, it will be observed that the slit side of an end screen bar is positioned against knife bar 104. Thus, fluid can escape from between such end screen bar and the bar 104 which is contacts. With the remaining screen bars in a semi-cylindrical assembly positioned with their slits 124 all on the side toward knife bar 104, passage of fluid between retainer bar 106 and the end screen bar adjacent thereto would be precluded, if such latter end bar were of the same construction as the remaining screen bars of the assembly. To provide for passage of fluid between retainer bar 106 and the end screen bar adjacent thereto, such end screen bar is provided with slits 124 on both sides, as is shown in Fig. 21. Of course, the screen bar having the slits in both sides can abut either one of knife bar 104 or retainer bar 106, and the screen bar having only one slit side can abut the other of knife bar 104 or retainer bar 106.

The semi-circular distance defining the arcuate line of assembly of a semi-cylindrical screen bar assembly, is of fixed length between knife bar 104 and retainer bar 106. We have found that if the screen bars vary slightly in width, they will fit more accurately and without jamming in such fixed space, to compensate for inaccuracies of dimensions if all of the bars are initially made with the intention of being exactly the same width. For this reason, the screen bars in cach semi-cylindrical screen bar assembly 107 are made in groups (preferably three); the bars of each group being of the same width, but the bars of the different groups varying in width slightly, in the order of about .02 of an inch. For example, the bars of one group may be .46 of an inch wide at the outer end, those of the second group .48 of an inch, and those of the third group .50 of an inch. The width at the tapered portions will vary correspondingly. The screen bars are assembled, however, in any order and not by groups.

Figure 19:
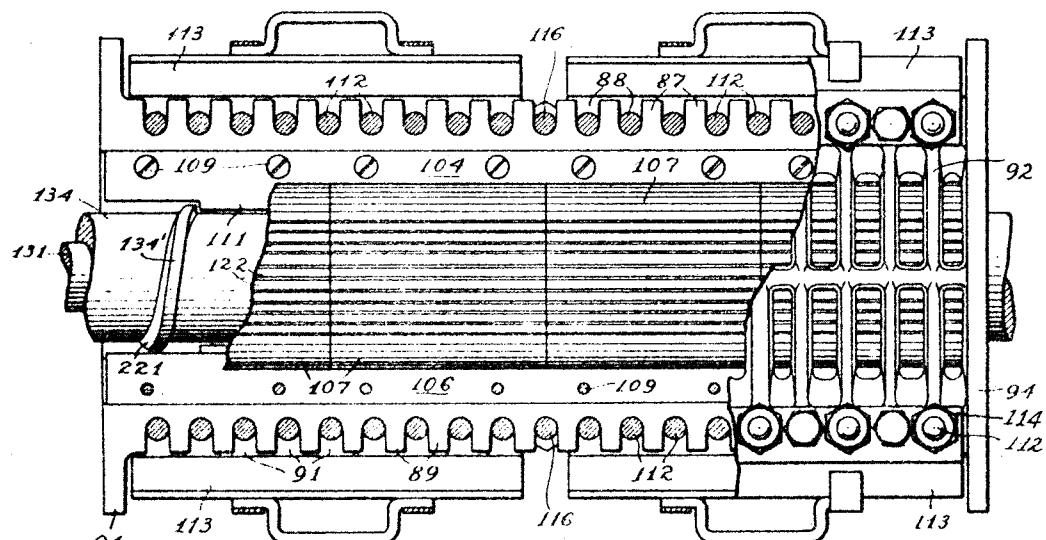
Fig. 19 is an exploded view, illustrating the main press cage, screen bar, knife bar, and screw assembly.
Figure 20:
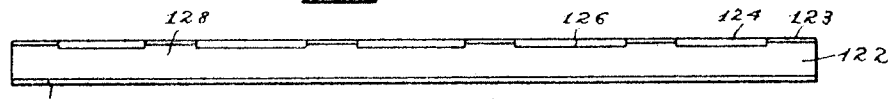
Fig. 20 is a bottom elevational view of a screen bar employed in the press assembly.

Preferably and as indicated by Fig. 19, the screen bars 122 are not of the same length as the length of the main press cage. A series of such screen bars are laid end to end, so as to have adjacent ends merely in abutting relationship along an arcuate line over a cage rib 92. We have found this to be a more satisfactory manner of assembly, although the screen bars can be of the same length as the cage if so desired; the latter requiring more accurate machining of the parts. Furthermore, the bars are heat treated; and it is comparatively difficult to heat treat a relatively long bar without distorting its shape. Therefore, the shorter bars are desirable.

To hold the screen bars rigidly against endwise displacement, the screen bar assemblies 107 (Fig. 5) abut at one end against arcuate clamping member 53 and arcuate retainer 54, both on the feed housing casting 3. At the opposite end, the screen bar assemblies 107 abut a ring 129 (Figs. 2 and 28) removably secured on discharge end casting 2.

*Main press screw assembly (Figs. 2, and 28 to 36)*

As can be gathered from the preceding description, a screw rotates in the main press to effect pressing of fluid. The screw assembly is of such construction as to create extremely high pressure, and embodies new principles of operation. The following description of the screw assembly will be one pertaining chiefly to details of mechanical construction; as it is believed that a clearer understanding can be obtained of the principles involved in such construction, if such principles are separately discussed as is done further on.

The main press screw comprises a shaft 131 which extends the entire length of the main press cage and projects at one end 132 (hereinafter called the discharge end) beyond the discharge end casting 2, and at the opposite end 133 (hereinafter called feed end) beyond the bearing housing 33. Shaft 131 supports for rotation therewith a plurality of abutting sleeves 134, 136, 137 and 138, which have the separated screw flights 134' and 134", 136', 137', and 138' and 138", respectively, integral therewith; the spaced projections 111 of knife bars 104 extending into the spaces between the screw flights. Each of the screw flights is of helical or spiral conformation, and is of continuous or uninterrupted character. Sleeve 134 (Fig. 34) has an internal diameter intermediate its ends, of larger diameter than shaft 131, and is provided with internal threads 139 which provide cooling fins in spaced relationship to shaft 131; the sleeve being rigidly mounted at the discharge end 141 thereof on splines 142 and at the feed end 143 on one-half of splines 144. Discharge end 141 of sleeve 134 projects beyond splines 142, and is provided with an inner annular recess 146, having the packing 147 therein adjacent the ends of splines 142. Nut 148 screwed onto shaft 131 and held in position by lock pin 149, provides an end abutment for sleeve 134 and, consequently, for the entire sleeve assembly.

Sleeves 136, 137 and 138 are of the same general construction as sleeve 134; all of them being secured on splines, and having the internal threads 139 spaced from shaft 131 to provide cooling fins. Sleeve 136 is mounted at one end on the other half of splines 144 and has an overlapping joint connection with sleeve 134, formed by an inner flange 151 on sleeve 134 being telescoped within an outer flange 152 on sleeve 136. A dam ring 153 is clamped between small shoulders on sleeves 134 and 136 for rotation therewith, and is positioned over the joint between the sleeves. The dam ring 153 fits, with only slight clearance, in the cylindrical space formed by the screen bar assemblies 107, and has its front face beveled as indicated at 154. As can be seen from Fig. 2, knife bar projection 111 between screw flights 134" and 136', is recessed at 156 to accommodate the dam ring. A second dam ring 157 (Fig. 34) is mounted adjacent the end of sleeve 136 which is opposite to the end upon which dam ring 153 is mounted. Dam ring 157 fits tightly on sleeve 136 for rotation therewith and abuts an annular shoulder 158 on the sleeve; it is of the same construction as dam ring 153 and is positioned between screw flights 136' and 137'. Sleeve 137 is mounted at one end on one-half of splines 158' and has an overlapping male and female joint 159 with sleeve 136, similar to the overlapping joint between sleeves 134 and 136. The opposite end of sleeve 137 is mounted on splines 161 and overlaps sleeve 138 to provide an overlapping joint; the sleeve 138 being mounted, at the feed end, on splines 162 (Figs. 29 and 33), which splines 162 are adjacent enlarged cylindrical portion 163 on shaft 131.

Because of the overlapped joints between the screw flight sleeves 134, 136, etc., leakage past the joints is prevented. With the usual joints, heretofore employed in the art, wherein flat vertical faces were abutted together, oil and meal would be forced between the sleeve sections; and upon hardening of the meal, it became impossible to remove the sleeves without using great forces, such as sledge hammers, hydraulic presses, etc. Furthermore, our type of joint allows for proper expansion and contraction of the sleeves under the influence of changes of temperature; while at the same time maintaining a leak proof connection between sleeves.

The provision of the splines on the main shaft for mounting the screw flight sleeves enables a minimum diameter shaft for the obtaining of maximum strength. Also, it enables the screw flight sleeves to carry a part of the torsional forces imposed upon the rotatable main screw shaft assembly, thus making for a construction adapted to withstand high pressure.

With particular reference to Figs. 29 and 30, the feed end of the main press screw assembly will now be described. Upon the cylindrical portion 163 of the shaft is journaled bearing sleeve 164 which has an overlapped joint engagement with sleeve 138, as indicated at 166. Spaced portions 167 and 168 of sleeve 164 are journaled, respectively, in spaced walls 37 and 34 of the feed housing casting 3; and in the portion 167 are formed grooves 169, to prevent escape of lubricant to the feed housing. A packing 171 in groove 36 (Figs. 3 and 5) engages bearing portion 168. In the space between portions 167 and 168, are formed radial passages 171' which lead into the space or opening 39 between walls 37 and 34. The bearing sleeve 164 extends well into bearing housing 33 which has the lubricant introduction passage 172; and end thrust is taken up by end thrust bearing 173, located between an end of sleeve 164 and a bearing cap 174 removably secured to bearing housing 33.

From the preceding description, it will be apparent that lubricant introduced into bearing housing 33 cannot escape into the press, to contaminate the material in the press, because radial passages 171' and opening 39 provide for drainage of lubricant before it reaches the press. Conversely, no oil or material can escape from the press to cause jamming of the bearing.

The feed end 133 (Fig. 29) of main shaft 131 has a longitudinal passage 176 extending therethrough for escape of cooling fluid (preferably water which is circulated through the entire main shaft and screw flight sleeve assembly in a manner to be subsequently described). Such passage is closed by plug 177 screwed into the end of the shaft; radial passages 178 (Figs. 29 and 32) being provided in shaft 131 so as to communicate with passage 176. Ring 179, secured to splines 180 at the end of shaft 131, has an inner annular groove 181, communicating with radial passages 178 in the main shaft and with radial passages 182 in the ring. Ring 179 is rotatable with shaft 131; and a stationary collecting ring 183 about ring 179 provides for final escape of the cooling water through pipe 184, which, if water is scarce, can be connected to a water cooler (not shown), enabling reuse of the water. The drive (Fig. 29) for the main shaft 131 is by means of semi-universal coupling 186 having a key connection 187 with sleeve 188 secured to prime mover shaft 189; a similar key connection being provided between the coupling and ring 179.

As was previously set forth, end thrust bearing 173 is provided; such bearing takes up the end thrust exerted toward the feed end of the main shaft during operation of the press, and is under compression during such operation. Consequently, the thrust bearing 173 prevents endwise shifting of the main shaft toward the feed end. To preclude endwise shifting of the main shaft toward the discharge end, a removably secured locking ring 191, comprising two half rings clamped on the main shaft, is positioned between bearing cap 174 and ring 179.

Cooling fluid (Figs. 28 and 34) is introduced through the discharge end 132 of the main shaft 131, by means of feed pipe 192 which projects into the main shaft and communicates with longitudinal fluid passage 193 in shaft 131. Pipe 192 is stationary and is held in position by lock nut 194, which is screwed into the discharge end of the main shaft and is journaled about pipe 192. Passage 193 leads into radial passages 196 (Figs. 28, 34, 35 and 37), located past the first set of main shaft splines 142 and which communicate with the space between sleeve 134 and the main shaft. Because of contact of cooling fluid with internal cooling fins or threads 139 on the sleeve 134, heat is rapidly conducted to effect efficacious cooling, not only of the sleeve 134 and screw flights 134' and 134'', but of the material in contact therewith.

From the space between sleeve 134 and shaft 131, the cooling fluid is conducted into the space between the adjacent sleeve 136 and the shaft (Figs. 35 and 37), by means of alined passages 197 formed in the abutting internal splines 198 on sleeves 134 and 136; the splines 198 being rigidly interengaged with the shaft splines 144 as previously explained. The same construction in the sleeve splines, is employed for conducting the cooling fluid all along the main shaft, until it enters the space between the feed end sleeve 138 (Fig. 29) and the main shaft 131. From the latter space, cooling fluid enters radial passages 199 which lead into the cooling discharge passage 176 previously described. Thus, cooling fluid is circulated through and along the entire main shaft and screw assembly. The functional effect of the cooling fluid on the material will be subsequently explained.

With reference to Figs. 2, 28 and 31, the manner of discharge of material from the press and the journaling of the discharge end of the main press screw assembly will now be described. On the outer end of discharge casting 2, is secured an arcuate bracket 201 having integral therewith arms 202 terminating in a large bearing 203, which provides the discharge end journal for the main press screw assembly. Journaled in bearing 203 is a sleeve 204 which is splined for axially slidable movement along the discharge end 132 of shaft 131, by means of a cone key connection 206 between the shaft and sleeve 204. On sleeve 204 is removably secured, by screws 207, the press discharge cone 208 which has an inwardly flaring relatively long conical end portion 209 contacting over sleeve 134, and forming an adjustable outwardly flaring material discharge passage 211 with the wall of an outwardly flaring aperture formed in wearing ring 129; the ring 129 having been previously described.

It will be observed that wearing ring 129 and cone portion 209 are directly adjacent the discharge end of the screen bar assembly 107. Therefore, the release of material through discharge passage 211 obtains at a point closely adjacent the screen bar assembly; and because of the relatively long taper of the cone, the point of pressure change is well within the main press cage. Consequently, any fluid which might be expressed by the cone and wearing ring, can escape from the main press cage and not be lost, which is not the case with respect to constructions where the material discharge passage, formed by a discharge cone, is some distance away from the discharge end of the screen bars or drainage means.

Means are provided to effect adjustment of the size of discharge passage 211. Sleeve 204 (Fig. 28) is formed, at the end opposite to the end having cone 208 secured thereto, with an annular groove 212 in which is engaged a split ring 213 secured to hand wheel 214 screwed on shaft 131. Hand wheel 214 can be locked in position by lock nut 216. When it is desired to adjust the size of discharge passage 211, lock nut 216 can be loosened and a bar or other suitable instrument can be inserted in one of the holes 217 in wheel 214, to effect turning of the wheel and, consequently, axial adjustment of cone 208. When the cone has been adjusted to the desired position, it can be held there to fix the size of discharge passage 211, by re-tightening the lock nut 216.

In positioning the main press shaft 131 and the screw flight sleeves thereon in the main press (Figs. 2, 28 and 29), the main press cage can be first assembled but with its sections in open position on lower hinge or pivot bolts 98. After mounting of the screw flight sleeves and the discharge cone assembly on the main shaft 131, the entire main shaft with all the parts mounted thereon can be inserted, as a single unit, through bearing 203 and the aperture of ring 129, because the bearing and ring aperture are of a size large enough to permit insertion therethrough of all members on the shaft 131 which have to pass through the bearing and the ring aperture. After the main shaft assembly has been positioned, locking ring 191 can be secured to the shaft for the purpose previously explained. The main press cage sections can then be secured together. Should it be desired to remove the main press shaft assembly, this can be readily done in a reverse manner. Thus, it is apparent that the large size bearing 203 provides an arrangement which permits ready positioning, or removal of the main shaft assembly for replacement or repair of parts.

Principle of main press construction

The features of construction thus far described, provide a press structure which is capable of withstanding the effects of excessively high pressure. For obtaining such pressure which is high enough to heat up the material excessively and express fluid from the material without the necessity of first processing the material by heat such as steam, we employ a special design and arrangement of the screw flights in the main press. This arrangement will now be described with particular reference to Fig. 2 and the schematic view of Fig. 12.

As was previously explained, the screw flights are separated, thus providing (Fig. 12) blank spaces A, B, C, D, E and F in the main press; the knife bar projections 111 extending into and substantially filling each blank space. Such blank spaces are provided, because we have found that fluid expression is greatest at the point where a screw flight is located just ahead of a blank space; particularly if the blank space is comparatively long. For the latter reason, blank spaces B, C, D, and E (namely those with the exception of the blank space F preceding cone 209) are each quite long in comparison with screw flights 138', 137', 136' and 134'', respectively, preceding each of said blank spaces. In each case, a blank space is considerably longer than over half the length of the preceding screw flight and is preferably longer. Blank space F is not of such extreme length, because we can readily adjust the cone 209 to provide the desired effect in blank space F. All the screw flights are rotatable in unison; and because of the long blank spaces provided, there exist virtually a plurality of independent main presses which form part of the main press unit, each of which creates sufficient pressure to express fluid. This is so because the longer a given blank space between screw flights, the less influence the succeeeding screw flight has in relieving the pressure which is being created by the preceding screw flight feeding the material into the blank space. Such succeeding screw flight, because of its function in feeding the material, has the effect of tending to reduce pressure in the blank space which it follows. The fluid is thus expressed substantially along the entire length of the main press cage.

Screw flight 138'' (Fig. 2) operates in the feed press and cooperates with vertical screw flight 82 to effect preliminary expulsion of fluid and to build up pressure for material in the main press; and for this reason and also for the reason of saving space, blank space A (Fig. 12) is not made so long; reliance being placed on the remaining blank spaces to produce the effect described.

Because each screw flight in the main press acts to express fluid, there will be a progressive decrease of volume of material in the main press. To compensate for this decrease in volume so as to maintain the high pressure, blank spaces B, C, D and E are made of progressively decreasing length. In actual construction and with reference to Fig. 12, and also to Fig. 2 which is drawn to a scale of 1 inch to a foot, blank space B is 5⅜ inches long, blank space C 5⅜ inches long, blank space D 4⅞ inches, and blank space E 4⅝ inches. Because of the peculiar effect of the blank spaces, they can properly be called friction areas for developing pressure.

To increase further pressure in the main press and to keep the material in a highly active state in the main press, the screw flights 134', 134'', 136', 137', 138' and 138'' are constructed to have a special relationship with respect to each other. Starting with screw flight 138'', they have a progressively decreasing pitch and an increasing root diameter; the screw flight sleeves having a tapered relationship to provide for the increasing root diameter. In actual construction, screw flight 138' has a 4½-inch pitch, screw flight 137' a 4-inch pitch, screw flight 136' a 3½-inch pitch, screw flight 134" a 3-inch pitch and screw flight 134' a 2½-inch pitch. The manner in which the special relationship of the screw flights builds up pressure can be explained as follows: Two adjacent screw flights rotate together at the same speed since they are mounted on the same shaft. Because a first screw flight is of greater pitch than a second screw flight, it will force material to the second screw flight at a greater rate than the second screw flight can remove the material, thus building up high pressure in the friction area between the screw flights. Inasmuch as the screw flights are of progressively increasing root diameter, effected by the increasing taper of the screw flight sleeves, each succeeding screw flight operates in a space of lesser volume than a preceding screw flight, to compensate also for decrease in volume of material caused by expressing of fluid therefrom. In this connection, it will be noted that the friction areas B, C, D, E and F progressively decrease in volume, not only as a result of their progressively decreasing length but because of the increase in taper of the sleeves from the feed end of the press to the discharge end.

The leading face 221 of each screw flight has a relatively high pressure angle, preferably 30 degrees; and each screw flight rotates with only slight clearance within the screen bar assembly. The clearance, with the exception of the last two screw flights 134' and 134", is about $\frac{1}{32}$ of an inch; and the cylinder defined by the inner surface of the screen bar assemblies 107 is about 7 inches in diameter. Because of the leading face angle 221 of the screw flights, the material is thoroughly agitated to make for efficacious pressing of fluid; the slight clearance allowing some of the material to flow back over the screw flights to prevent dangerous pressure. The clearance of the last two screw flights 134' and 134" within the screen bar assemblies 107, is approximately $\frac{1}{64}$ of an inch greater than that of the preceding screw flights, because of the fact that when the material arrives near the discharge end of the press, it is extremely viscous as a result of pressing out of fluid therefrom. Hence, compensation for the increased viscosity obtains, to prevent too dangerous a pressure at the discharge end.

Although dimensions of some of the parts are given above, these dimensions are not essential for the construction of a press to produce the results pointed out, but are merely given, by way of example, for the purpose of emphasizing the relationship in the size of the parts. They may vary within wide limits depending on the size of the press and the particular kind of material which the press is to handle.

Dam rings 157 and 153 which follow screw flights 137' and 136', respectively, project or extend beyond the root face of the screw assembly and act as internal cones to aid further in building up high pressure and to maintain high pressure throughout the entire main press cage. The dam rings (Fig. 12), it will be noted, are located adjacent the ends of friction areas C and D, and their beveled faces 154 are pitched toward the feed end of the press to facilitate forcing of material thereover; the dam rings having slight clearance within the screen bar assemblies 107. As material is forced toward the discharge end of the press, the dam rings, since they pass entirely about the main screw assembly, serve to partially block or offer obstruction to the passage of material and thereby increase the pressure on the screw flights which they follow.

Because of the slight clearance ($\frac{1}{32}$ of an inch) of the dam rings in the screen bar assemblies 107, the extremely high pressure developed on the material, as it is forced toward the dam rings, causes a rise in temperature to heat the moisture in the material. When the material, for example, passes by a dam ring 157 (Fig. 12) to enter the space between the dam ring and a following screw flight 136', a release of pressure obtains. This allows the moisture in the material to expand into steam, thus preparing the fluid for ready expulsion by the following screw flight 136'.

Inasmuch as the provision of the blank spaces, dam rings and special screw flight relationship, results in thorough expulsion of fluid throughout the press, reliance need not be placed solely on cone 209 to provide for development of pressure, as has been heretofore necessary in previous press constructions. As a result, passage 211 can be adjusted to a comparatively large width so as to enable a thick discharge cake. We have actually produced cake a half inch thick. Such thick cake is desirable, because a thick cake is hard enough not to dust, but at the same time is soft enough to allow cattle to eat the cake without breaking their teeth.

Method

The pressure which the foregoing described main screw assembly builds up, is so high as to create sufficient friction to cause normally excessive heating of the material being handled; the heat being to such extent as to cause a rise in temperature approaching the scorching point of the material, and actually does cause scorching or burning of the protein, fibre and/or oil in the material. Also, it is high enough to reduce materially the viscosity of the material; and since the pressure is a function of viscosity of the material, such reduction in viscosity would act to impede maximum expulsion of fluid. By means of the cooling fluid and cooling fins, which serve to effect rapid cooling of the entire main press screw assembly from end to end, the temperature of the material is kept sufficiently low so as to prevent a deleterious change in the material caused by burning and/or scorching thereof, and to prevent excessive reduction in viscosity to a point below which efficacious expressing of fluid cannot be had.

Also, cooling of the material in the manner described so as to maintain it at a relatively low temperature, serves to prevent deleterious chemical changes which otherwise occur in the material as a result of excessive heat. Such chemical changes, caused by excessive heat, normally effect alteration in the fibrous, gummy, protein and/or oil content of material, to thereby cause a large portion of the oil or fat to be retained in the cake or meal discharged from the press. Furthermore, as was previously stated, our press does not require processing of most material by preheating it as has been heretofore done in the art. Thus, the material can be fed to the press, cold or in a very high state of viscosity characteristic of unheated material, to enhance pressing out of fluid therefrom. In the prior art devices which require considerable initial heating of the material before it is fed to the press, the viscosity of the material is reduced to such extent as to make maintenance of pressure in the press extremely difficult.

From the preceding explanation of the functioning of our press, it will be apparent that a novel method or manner of handling the material obtains.

Operation of press apparatus

The feed press screw is positively driven without a slip clutch connection, by adjustable-speed motor 13 at such speed, as to express a part of the fluid through its own cage and to insure a rapid development of higher pressure by the main press screw assembly. Hence, the feed press increases the capacity of the main press. The adjustable-speed drive for the feed press is advantageous because it enables the operator to keep the main press fully loaded to maintain constant pressure, regardless of variation in the quality of material, which variations generally exist in differing batches of material. As copra, for example, varies widely in physical properties and quality, the operator can readily change the speed of operation of the feed press to suit conditions. Because of the positive drive for the feed press, the pressure is maintained at all times.

Portable press (Fig. 38)

In the pressing out of oil from material such as whole cotton seed, it has been the practice for the farmers to truck their seed to a comparatively large central press plant. This requires numerous of such plants in any given locality to avoid the necessity of too long a haul for the farmers. Because the press apparatus of our invention does not require a steam plant and accessory apparatus pertaining thereto for first processing the material by application of heat, and because it has an extremely high capacity enabling the use of a small unit, it can be readily mounted on a comparatively small vehicle such as a flat car or automobile truck. This vehicle can be moved about from location to location, thus obviating the foregoing described disadvantage. Fig. 38 depicts more or less diagrammatically the mounting of two of our press apparatus units 222 on a flat car 223. When the flat car is moved to a desired location, the motors for operating the main press and the feed press of each unit can be readily connected with a source of power; and the main press can be connected by piping to a suitable source of water, to allow for operation of the press apparatus. If desired, a separate power plant can be installed on the flat car.

Summary

In operation, the press of our invention, because of the high pressure which it is capable of producing on the material, effects a larger yield of oil or fat content from the material; and a lesser percent of fat or oil is left in the cake or meal, than has heretofore been possible with previously known presses. The press has an extremely high capacity, thus enabling a small unit construction, in comparison with prior press apparatus. By virtue of the fact that high pressure is maintained throughout the entire length of the main press, regardless of the progressive reduction in volume of the material as a result of progressive loss of fluid from the feed end to the discharge end, the main press can be considered as embodying a plurality of individual presses; each individual press comprising a screw flight and a friction area with a knife bar projecting into the friction area.

Because of the manner in which our press compensates for decrease in volume of the material as a result of expressing of fluid therefrom, it will be apparent that the method of our invention embodies this feature, as well as that of creating sufficient pressure normally to effect deleterious change in the material, and simultaneously cooling the material to prevent the change.

We claim:

1. The method of expressing fluid from material, comprising providing a main passageway for said material and a feed passageway communicating with said main passageway, applying pressure on said material in said feed passageway sufficient to cause a partial expressing of fluid in said feed passageway, causing said material to travel from said feed passageway through said main passageway while pressure is applied on said material in said main passageway, and positively variably regulating the rate of feed of material and application of pressure thereon in said feed passageway in accordance with conditions of said material in said main passageway to maintain the pressure in said main passageway.

2. An apparatus of the class described, comprising a main press, and a tube-like feed press of a volumetric capacity less than that of the main press for supplying material to said main press and including pressure applying screw means rotatable about an axis extending longitudinally of the feed press for effecting a partial expressing of fluid from said material before said material reaches said main press, both of said presses being in substantially unrestricted communication to enhance maintenance of pressure therebetween, and said feed press having drainage openings in the periphery thereof for escape of fluid.

3. An apparatus of the class described, comprising a main press, rotary screw pressure applying means therein, a feed press for supplying material to said main press and for effecting a partial expressing of fluid from said material before said material reaches said main press, rotary screw pressure applying means in said feed press, and means for varying the relative speed of rotation between said main press and said feed press rotary screw means.

4. An apparatus of the class described, comprising a main press having a substantially horizontal passageway enclosed by a screen structure, a feed press having a substantially horizontal passageway communicating with said passageway in said main press and also having an upright passageway communicating with said substantially horizontal passageway therein, said upright passageway being enclosed by a screen structure, rotary screw pressure applying means in said upright passageway of said feed press, and rotary screw pressure applying means extending through said substantially horizontal passageways of said main press and said feed press.

5. An apparatus of the class described, comprising a main press, rotary screw pressure applying means therein, a feed press for said main press, rotary screw pressure applying means in said feed press, and adjustable speed positively-acting driving mechanism for varying the speed of said feed press rotary screw means relative to said main press rotary screw means to enhance maintenance of pressure.

6. In a press for the expressing of fluid from material and having a feed end and a discharge end, pressure-creating rotary screw means therein including a plurality of spaced screw flights between said feed end and said discharge end, each of said screw flights being uninterrupted for a length extending over half the circumference of the root diameter thereof and the space between the ends of adjacent screw flights being sufficiently long to enhance maintenance of pressure by the screw flight preceding said space, and said spaces decreasing in length and volume from said feed end to said discharge end.

7. In a press for the expressing of fluid from material and having a feed end and a discharge end, pressure creating rotary screw means therein including a plurality of spaced screw flights between said feed end and said discharge end, each of said screw flights being uninterrupted for a length extending over half the circumference of the root diameter thereof and the space between the ends of adjacent screw flights being sufficiently long to enhance maintenance of pressure by the screw flight preceding said space, said spaces decreasing in length and volume from said feed end to said discharge end, and said screw flights decreasing in pitch from said feed end to said discharge end.

8. In a press for the expressing of fluid from material and having a feed end and a discharge end, pressure-creating rotary screw means therein including a plurality of spaced screw flights between said feed end and said discharge end, each of said screw flights being uninterrupted for a length extending over half the circumference of the root diameter thereof and the space between the ends of adjacent screw flights being sufficiently long to enhance maintenance of pressure by the screw flight preceding said space, said spaces decreasing in length and volume from said feed end to said discharge end, and screw flights decreasing in pitch and increasing in root diameter from said feed end to said discharge end.

9. In a press for the expressing of fluid from material and having a feed end and a discharge end, pressure-creating rotary screw means therein including a plurality of spaced screw flights between said feed end and said discharge end, each of said screw flights being uninterrupted for a length extending over half the circumference of the root diameter thereof and the space between the ends of adjacent screw flights being greater than half of the length of the screw flight preceding said space, said spaces decreasing in volume from said feed end to said discharge end, and said screw flights decreasing in pitch and increasing in root diameter from said feed end to said discharge end.

10. In a press for the expressing of fluid from material and having a feed end and a discharge end, pressure-creating rotary screw means therein including a plurality of spaced substantially imperforate screw flights between said feed end and said discharge end, each of said screw flights being uninterrupted for a length extending over half the circumference of the root diameter thereof and the space between the ends of adjacent screw flights being longer than the length of the screw flight preceding said space to provide a friction area for development of pressure, and knife bar projections in the said friction areas between said screw flights.

11. In a press for the expressing of fluid from material and having a feed end and a discharge end, rotary screw means therein including a plurality of spaced screw flights between said feed end and said discharge end, and means rotatable with said rotary screw means in a space between the ends of adjacent screw flights for damming the movement of material, said damming means projecting into said space for a distance beyond the roots of said adjacent screw flights.

12. In a press for the expressing of fluid from material and having a feed end and a discharge end, rotary screw means therein including a plurality of spaced screw flights between said feed end and said discharge end, and a dam ring in a space between the ends of adjacent screw flights and projecting into said space for a distance beyond the roots of said adjacent screw flights, said dam ring being positioned adjacent the end of the second of said adjacent screw flights and being rotatable therewith.

13. In a press for the expressing of fluid from material and having a feed end and a discharge end, a rotatable shaft extending through said structure, spaced screw flights mounted on said shaft and rotatable therewith, the screw flights decreasing in pitch and increasing in root diameter from said feed end to said discharge end, the spaces between the screw flights being of sufficient length to enhance maintenance of pressure, knife bar projections in said spaces, and material damming means in a plurality of said spaces and projecting into said spaces for a distance beyond the roots of adjacent rotary screw flights.

14. In a press for the expressing of fluid from material, a press shaft, and screw flight members mounted on said shaft, adjacent members having their adjacent ends in abutment and secured to said shaft to provide a substantially rigid connection therewith, the portions of said members between said connections being spaced from said shaft, said shaft having a passage for flow of cooling fluid, said passage opening into a space between a member and the shaft at one end of a connection, and said latter connection having a passage to allow said cooling fluid to flow therethrough into the space at the other end thereof.

15. In a press for the expressing of fluid from material, a rotatable shaft for carrying pressure applying means, a supporting structure adjacent the feed end of the press and in which an end portion of the shaft is journaled, a thrust bearing in said structure limiting endwise movement of said shaft in one direction and under compression when said press is in operation, and means independent of driving mechanism for said shaft adapted to be removably secured to said shaft outside of said structure for limiting endwise movement of the shaft in the opposite direction.

16. In a press for the expressing of fluid from material, an arcuate screen bar assembly, the bars of said assembly being in groups of different size, with the bars of any given group of the same size.

17. In a press for the expressing of fluid from material, an arcuate screen bar assembly, and a retaining member adjacent each end bar of said assembly against which a side of the end bar abuts, one of said end bars having its side adjacent a retaining member provided with slits and its opposite side unslit, the other of said end bars having both of its sides slit, and the bars between said end bars each having only one slit side which abuts the unslit side of an adjacent bar.

18. In a press for the expressing of fluid from material, a unitary press cage section comprising a plurality of spaced arcuate ribs and a longitudinally extending flange joined to a plurality of said ribs, a screen bar retaining member mounted in said flange and having a portion projecting beyond the inner edge of said flange, and an arcuate screen bar assembly mounted in said section and having an end bar thereof abutting said portion of the retaining member, said inner edge of said flange in the space between said ribs being spaced from said end bar to allow unimpeded flow of fluid adjacent said end bar.

19. In a press for the expressing of fluid from material, a plurality of cage sections having mating flanges, fastening members for holding said flanges together, and a carrier for a plurality of said fastening members.

20. In a press for the expressing of fluid from material, a plurality of cage sections having mating flanges, said flanges having spaced open ended slots adapted to receive fastening bolts for holding said flanges together, and means for carrying a plurality of bolts in the same spaced relationship as that existing between the slots, all of said bolts being thus carried except an intermediate bolt.

21. In a press for expressing of fluid from material, a plurality of arcuate cage sections adapted to be held together to provide a tubular structure, and a pair of spaced supports between which said sections are positioned, said supports being slotted and ends of the cage sections being formed with complementary slots to receive locking bars.

22. In a press for the expressing of fluid from material, a pair of arcuate cage sections, each section having end flanges, a pair of supports between which the sections are positioned, means for providing a pivotal mounting for the lower end of each of said end flanges on a support, whereby said sections can be swung apart or brought together on the pivots, said end flanges and said supports being formed with cooperating slots adapted to receive locking bars to prevent endwise displacement of said sections, said slots being shaped to allow said pivotal movement when the bars are in position, and removable means for rigidly holding said sections together intermediate said supports.

23. In an apparatus for the expressing of fluid from material, a feed press having a horizontal passage and a vertical passage in substantially unrestricted communication with said horizontal passage, pressure applying rotary screw means in both of said passages in pressure transferring relationship through said substantially unrestricted communication, an arcuate screen structure mounted on the lower part of said horizontal passage, and an annular screen structure in the vertical passage about the screw means therein.

24. In an apparatus for the expressing of fluid from material, a main press having a passage, a feed press having a passage in substantially unrestricted communication with said main press passage, an annular screen structure in said feed press passage, a rotatable pressure applying screw in said feed press passage, and knife bar means cooperating with said screw.

25. In an apparatus for the expressing of fluid from material, a plurality of arcuate screen bar assemblies, and a bar against opposite edges of which end bars of adjacent assemblies are adapted to abut, said edges and the abutting edges of said end bars having cooperating slanting faces to prevent shifting of said assemblies.

26. In an apparatus for the expressing of fluid from material, a tubular structure comprising arcuate screen devices, a bar positioned between adjacent devices, rotatable screw pressure applying means in said structure, an end of said bar being provided with a wedge shaped notch, and a knife bar for cooperating with said screw means, said knife bar having a wedge shaped body portion adapted for endwise insertion in said notch.

27. In an apparatus for the expressing of fluid from material, a feed press comprising an integral casting having a vertical passage and a horizontal passage, the bottom of the horizontal passage being formed by spaced arcuate ribs, the vertical passage being formed by spaced arcuate ribs, the vertical passage being formed by spaced arcuate ribs having their ends integral with parallel walls, and a main press shaft bearing housing forming a continuation of said horizontal passage.

28. In a press for the expressing of fluid from material and having a feed end and a discharge end, rotary screw means therein including a plurality of spaced screw flights between said feed end and said discharge end, the spaces between said screw flights and the character of said screw flights being arranged to compensate for reduction in volume of the material as it travels from the feed end to the discharge end to thereby effect maintenance of pressure throughout the length of said rotary screw means, means between screw flights to prevent turning of the material, and dam means rotatable with said rotary screw means and projecting beyond the root thereof.

29. In a press for the expressing of fluid from material and having a feed end and a discharge end, rotary screw means therein including a plurality of spaced screw flights between said feed end and said discharge end, the spaces between said screw flights and the character of said screw flights being arranged to compensate for reduction in volume of the material as it travels from the feed end to the discharge end to thereby effect maintenance of pressure throughout the length of said rotary screw means, means between screw flights to prevent turning of the material, dam means rotatable with said rotary screw means and projecting beyond the root thereof, and means for conducting a cooling fluid entirely through said rotary screw means to prevent excessive heating and reduction in viscosity of the material along the entire region in which pressure is applied.

30. In a press for the expressing of fluid from material and having a feed end and a discharge end, rotary screw means therein including a plurality of spaced screw flights between said feed end and said discharge end, the spaces between said screw flights and the character of said screw flights being arranged to compensate for reduction in volume of the material as it travels from the feed end to the discharge end to thereby effect maintenance of pressure throughout the length of said rotary screw means, means between screw flights to prevent turning of the material, dam means rotatable with said rotary screw means, means for conducting a cooling fluid entirely through said rotary screw means to prevent excessive heating and reduction in viscosity of the material along the entire region in which pressure in applied, a positively driven fluid expulsion press for feeding material to said rotary screw means, and means for varying the speed of said feed press to compensate for change of pressure conditions at said rotary screw means.

31. In a press for the expressing of fluid from material and having a feed end and a discharge end, rotary screw means therein including a plurality of spaced screw flights between said feed end and said discharge end, the spaces between said screw flights and the character of said screw flights being arranged to compensate for reduction in volume of the material as it travels from the feed end to the discharge end to thereby effect maintenance of pressure throughout the length of said rotary screw means, means between screw flights to prevent turning of the material, dam means rotatable with said rotary screw means, means for conducting a cooling fluid entirely through said rotary screw means to prevent excessive heating and reduction in viscosity of the material along the entire region in which pressure is applied, a positively driven fluid expulsion press for feeding material to said rotary screw means, a screen structure about said feed press to allow escape of fluid from the feed press to thereby increase the capacity of said rotary screw means, and means for varying the speed of said feed press to compensate for change of pressure conditions at said rotary screw means.

32. In a press for the expressing of fluid from material and having a feed end and a discharge end, a plurality of spaced rotatably mounted screw flights between said feed end and said discharge end, each of said screw flights being uninterrupted for a length extending over half the circumference of the root diameter thereof, the screw flights decreasing in pitch and the spaces between said screw flights decreasing in volume from said feed end to said discharge end, a knife bar projection between screw flights to preclude turning of material, and dam means between screw flights and projecting beyond the roots thereof.

33. In a press for the expressing of fluid from material and having a feed end and a discharge end, a plurality of spaced rotatably mounted screw flights between said feed end and said discharge end, a knife bar projection between screw flights, and a dam ring between said screw flights, and projecting beyond the roots thereof, the knife bar projection being recessed to accommodate the dam ring.

34. In a press for the expressing of fluid from material and having a feed end and a discharge end, a plurality of spaced rotatably mounted screw flights between said feed end and said discharge end, a knife bar projection between screw flights, and a dam ring between said screw flights and projecting beyond the roots thereof, the knife bar projection being recessed to accommodate the dam ring and the dam ring having a beveled face.

35. In a press for the expressing of fluid from material, means including a main rotary screw structure for pressing the material, a feed press for effecting partial expulsion of fluid from the material and for feeding the material to the rotary screw structure, a positive adjustable speed drive for said feed press, and means for controlling said drive to compensate for pressure changes at said rotary screw structure.

36. In a press for the expressing of fluid from material, means including a main rotary screw structure for pressing the material, and a feed press therefor of less volumetric capacity for effecting partial expulsion of fluid from the material, the feed press including pressure applying screw means in substantially unrestricted pressure communication with said main rotary screw means to enhance maintenance of pressure therebetween and being provided with a screen structure about such screw means to allow drainage of fluid to thereby increase the capacity of said main rotary screw structure.

37. An apparatus of the class described comprising a main press having pressure-creating rotary screw means therein, a tube-like feed press of volumetric capacity less than that of the main press having drainage openings in the periphery thereof and in substantially unrestricted pressure communication with said main press, and rotary screw pressure-creating means in said feed press to express fluid through said drainage openings and to feed the material under pressure to said main press whereby maintenance of pressure in said main press is enhanced.

38. In a press for the expressing of fluid from material, a plurality of unitary press cage sections, each section comprising a plurality of spaced arcuate ribs and a longitudinally extending flange joined to a plurality of said ribs, means securing said flanges together in mating relationship, screen bar retaining means mounted in the junction of said flanges and projecting beyond the inner edges of said flanges, and an arcuate screen bar assembly mounted in each section and having an end bar thereof abutting a side of the projecting part of said retaining means, the inner edge of each of said flanges in the spaces between said ribs being spaced from the end bar adjacent thereto to allow unimpeded flow of fluid adjacent said end bar.

39. In a press for the expressing of fluid from material and having a feed end and a discharge end, a plurality of spaced rotatably mounted pressure-creating screw flights between said feed end and said discharge end, and a dam ring in a space between adjacent screw flights and rotatable therewith, said dam ring being axially of less width than the length of said space and projecting into said space a distance beyond the roots of both the screw flights preceding the dam ring and the screw flight which follows the dam ring to provide a pressure-creating obstruction to the passage of material along said space.

40. In a press for the expressing of fluid from material and having a feed end and a discharge end, a rotatable shaft in said press, a plurality of spaced pressure-creating screw flights secured from rotation with said shaft between said feed end and said discharge end, each of said screw flights being uninterrupted for a length extending over half the circumference of the root diameter thereof, and a dam ring in a space between adjacent screw flights and secured for rotation with said shaft, said dam ring being axially of less width than the length of said space and projecting into said space a distance beyond the roots of both the screw flight preceding the dam ring and the screw flight which follows the dam ring to provide a pressure-creating obstruction to the passage of material along said space.

41. In a press for the expressing of fluid from material and having a feed end and a discharge end, rotary screw means therein including a plurality of spaced screw flights between said feed end and said discharge end, each of said screw flights being uninterrupted for a length extending over half the circumference of the root diameter thereof, the space between each of adjacent screw flights being so long in comparison with the length of such adjacent screw flights as to substantially preclude the screw flights following such space from influencing the pressure created by the screw flight preceding such space whereby each screw flight is capable of having a substantially independent press action on the material ahead of the screw flight, and a dam ring in a space between adjacent screw flights and projecting into said space a distance beyond the roots of both the screw flight preceding the dam ring and the screw flight which follows the dam ring to provide a pressure-creating obstruction to the passage of material along said space.

42. In a press for the expressing of fluid from material and having a feed end and a discharge end, rotary screw means therein including a plurality of spaced screw flights between said feed end and said discharge end, the space between each of adjacent screw flights being so long in comparison with the length of such adjacent screw flights as to substantially preclude the screw flight following such space from influencing the pressure created by the screw flight preceding such space whereby each screw flight is capable of having a substantially independent press action on the material ahead of the screw flight, the spaces between said screw flights and the character of said screw flights being arranged to compensate for reduction in volume of the material as it travels from said feed end to the discharge end, means projecting into spaces between the screw flights to prevent turning of material, and dam means in a space between screw flights and projecting into said space a distance beyond the roots of both the screw flight preceding said dam means and the screw flight which follows said dam means to provide a pressure-creating obstruction to the passage of material.

43. A press apparatus for the expressing of fluid from material comprising a main press having pressure-creating rotary screw means therein, a tube-like feed press for said main press of a volumetric capacity less than that of said main press and having drainage openings in the periphery thereof for escape of fluid expressed in the feed press, rotary screw pressure-creating means in said feed press to place material therein under compression and feed such material under pressure to said main press whereby maintenance of pressure in said main press is enhanced, and means in said feed press cooperating with said rotary screw means therein for obstructing rotation of material to thereby enhance maintenance of pressure by the rotary screw means in the feed press.

44. A press apparatus for the expressing of fluid from material comprising a substantially horizontally disposed main press having pressure-creating rotary screw means therein, a substantially vertically positioned tube-like feed press for said main press of a volumetric capacity less than that of said main press in pressure communication at its lower end with said main press and having drainage openings in the periphery thereof for escape of fluid expressed in the feed press, rotary screw pressure-creating means in said feed press to place material therein under compression and feed such material under pressure to said main press whereby maintenance of pressure in said main press is enhanced, and means in said feed press cooperating with said rotary screw means therein for obstructing rotation of material to thereby enhance maintenance of pressure by the rotary screw means in the feed press.

45. A press apparatus for the expressing of fluid from material comprising a substantially horizontally disposed main press having pressure-creating rotary screw means therein, a substantially vertically positioned tube-like feed press for said main press of a volumetric capacity less than that of said main press in pressure communication at its lower end with said main press and having drainage openings in the periphery thereof for escape of fluid expressed in the feed press, rotary screw pressure-creating means in said feed press to place material therein under compression and feed such material under pressure to said main press whereby maintenance of pressure in said main press is enhanced, means in said feed press cooperating with said rotary screw means therein for obstructing rotation of material to thereby enhance maintenance of pressure by the rotary screw means in the feed press, and means providing for variation in the relative speed of rotation between said main press and said feed press rotary screw means.

STANLEY HILLER.
HOWARD A. NIBECKER.

CERTIFICATE OF CORRECTION.

Patent No. 2,149,736. March 7, 1939.

STANLEY HILLER, ET AL.

It is hereby certified that error appears in the printed specification of the above numbered patent requiring correction as follows: Page 6, first column, line 26, for the word "is" read it; page 7, second column, line 60, after "cooling" insert fluid; page 12, first column, line 10, claim 18, for "space" read spaces; and second column, lines 19 and 20, claim 27, strike out the comma and words ", the vertical passage being formed by spaced arcuate ribs"; page 13, first column, line 52, claim 33, after "flights" strike out the comma; and second column, line 14, claim 37, before "volumetric" insert a; page 14, first column, line 7, claim 41, for "flights" read flight; and that the said Letters Patent should be read with this correction therein that the same may conform to the record of the case in the Patent Office.

Signed and sealed this 25th day of April, A.D. 1939.

(Seal)

Henry Van Arsdale
Acting Commissioner of Patents.